(12) United States Patent
Lau et al.

(10) Patent No.: US 11,858,062 B2
(45) Date of Patent: Jan. 2, 2024

(54) MULTI-POSITION CLAMP FOR FRICTION WELDING OPERATIONS

(71) Applicant: Fusematic Corporation, Ormond Beach, FL (US)

(72) Inventors: Harvey Lau, Silverdale, WA (US); Francis Baumann, Conroe, TX (US); John M. Griffin, Holly Hill, FL (US); Richard Jackson, Poulsbo, WA (US); Nicole Medina, Daytona Beach, FL (US); Mark Andrew Smith, Houston, TX (US)

(73) Assignee: Fusematic Corporation, Somerville, TX (US)

( * ) Notice: Subject to any disclaimer, the term of this patent is extended or adjusted under 35 U.S.C. 154(b) by 39 days.

(21) Appl. No.: 17/631,626

(22) PCT Filed: Jul. 7, 2020

(86) PCT No.: PCT/US2020/044423
§ 371 (c)(1),
(2) Date: Jan. 31, 2022

(87) PCT Pub. No.: WO2021/022120
PCT Pub. Date: Feb. 4, 2021

(65) Prior Publication Data
US 2022/0193817 A1  Jun. 23, 2022

Related U.S. Application Data

(60) Provisional application No. 62/881,340, filed on Jul. 31, 2019.

(51) Int. Cl.
*B23K 20/12* (2006.01)
*B23K 20/26* (2006.01)
*B23K 37/04* (2006.01)

(52) U.S. Cl.
CPC .............. *B23K 20/26* (2013.01); *B23K 20/12* (2013.01); *B23K 20/1285* (2013.01); *B23K 20/1295* (2013.01); *B23K 37/0435* (2013.01)

(58) Field of Classification Search
CPC .......................... B23K 20/26; B23K 37/0435; B23K 37/0217; B23K 20/10; B23K 20/12–1295; B23K 65/645; B29C 65/06–069
(Continued)

(56) References Cited

U.S. PATENT DOCUMENTS 2,302,813 A * 11/1942 Stuhlfauth ......... B23K 37/0435
269/218
3,073,187 A  1/1963 Aquilino
(Continued)

FOREIGN PATENT DOCUMENTS

CN   103495830 A  *  1/2014  ......... B23K 37/0435
CN   104353931 A  *  2/2015  ......... B23K 20/1245
(Continued)

OTHER PUBLICATIONS

International Search Report for International Application PCT/US2020/044423 dated Feb. 24, 2021.
(Continued)

*Primary Examiner* — Kiley S Stoner
(74) *Attorney, Agent, or Firm* — Mark Andrew Smith

(57) ABSTRACT

A multi-position clamp is disclosed for positioning and holding a portable friction welding tool adjacent a substrate for friction welding a plurality of fixtures in a precise pattern referenced from a fixed position on a substrate. The clamp has a clamp base temporarily securable at the fixed position on the substrate, a traveling mount comprising a tool mount for receiving said portable friction welding tool, and a connection to the clamp base allowing relative movement of the tool mount over the substrate. Index stops help install the
(Continued)

plurality of fixtures in the pattern and an articulated fixture loading system allow positioning and loading successive fixtures without disengaging and removing said portable friction welding tool from connection with the clamp base.

31 Claims, 22 Drawing Sheets

(58) Field of Classification Search
USPC .............. 228/112.1–114.5, 2.1–2.3; 156/73.5
See application file for complete search history.

(56) References Cited

U.S. PATENT DOCUMENTS

| | | | | |
|---|---|---|---|---|
| 3,298,586 | A * | 1/1967 | Allen | H01R 43/033 242/439.3 |
| 3,465,620 | A | 9/1969 | Hilburn | |
| 5,785,805 | A | 7/1998 | Fix | |
| 2004/0060966 | A1 * | 4/2004 | Stotler | B23K 20/1285 228/113 |
| 2005/0263569 | A1 * | 12/2005 | Miller | B23K 20/1285 228/2.1 |
| 2013/0017439 | A1 | 1/2013 | Takahashi | |
| 2015/0028083 | A1 * | 1/2015 | Miller | B23K 20/1295 228/2.1 |
| 2021/0107088 | A1 * | 4/2021 | Shira | B23K 20/12 |

FOREIGN PATENT DOCUMENTS

| | | | | |
|---|---|---|---|---|
| CN | 104400292 A | * | 3/2015 | ......... B23K 37/0435 |
| CN | 105108315 A | * | 12/2015 | |
| CN | 106425207 A | * | 2/2017 | ........... B23K 20/122 |
| CN | 107486675 A | * | 12/2017 | ......... B23K 37/0435 |
| DE | 102008016818 A1 | * | 10/2009 | ......... B23K 20/1285 |
| GB | 2496448 A | * | 5/2013 | ......... B23K 37/0211 |
| KR | 10-1341579 B1 | | 12/2013 | |
| KR | 10-1451281 B1 | | 10/2014 | |
| SU | 1006134 A1 | * | 3/1983 | |
| WO | WO-8606665 A1 | * | 11/1986 | |
| WO | WO-9309908 A1 | * | 5/1993 | ........... B23K 20/129 |
| WO | WO-2008120428 A1 | * | 10/2008 | ......... B23K 20/1295 |
| WO | WO-2011073465 A1 | * | 6/2011 | ......... B23K 20/1245 |
| WO | WO-2015036532 A1 | * | 3/2015 | ......... B23K 37/0217 |
| WO | WO-2015119519 A1 | * | 8/2015 | ............. B23K 10/00 |
| WO | WO-2016124168 A1 | * | 8/2016 | ........... B23K 20/123 |
| WO | WO-2016156039 A1 | * | 10/2016 | ......... B23K 37/0217 |
| WO | WO-2018080453 A1 | * | 5/2018 | ............. B23K 20/12 |
| WO | WO-2018114144 A2 | * | 6/2018 | ......... B29C 37/0082 |

OTHER PUBLICATIONS

Written Opinion for International Application PCT/US2020/044423 dated Feb. 24, 2021.

* cited by examiner

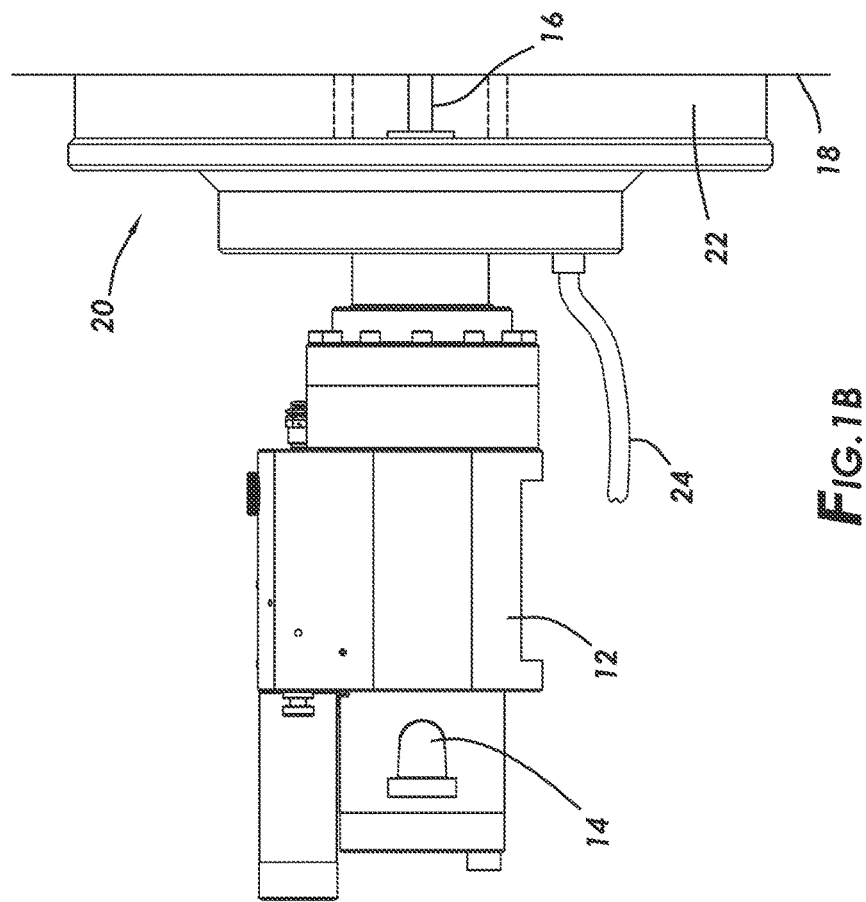
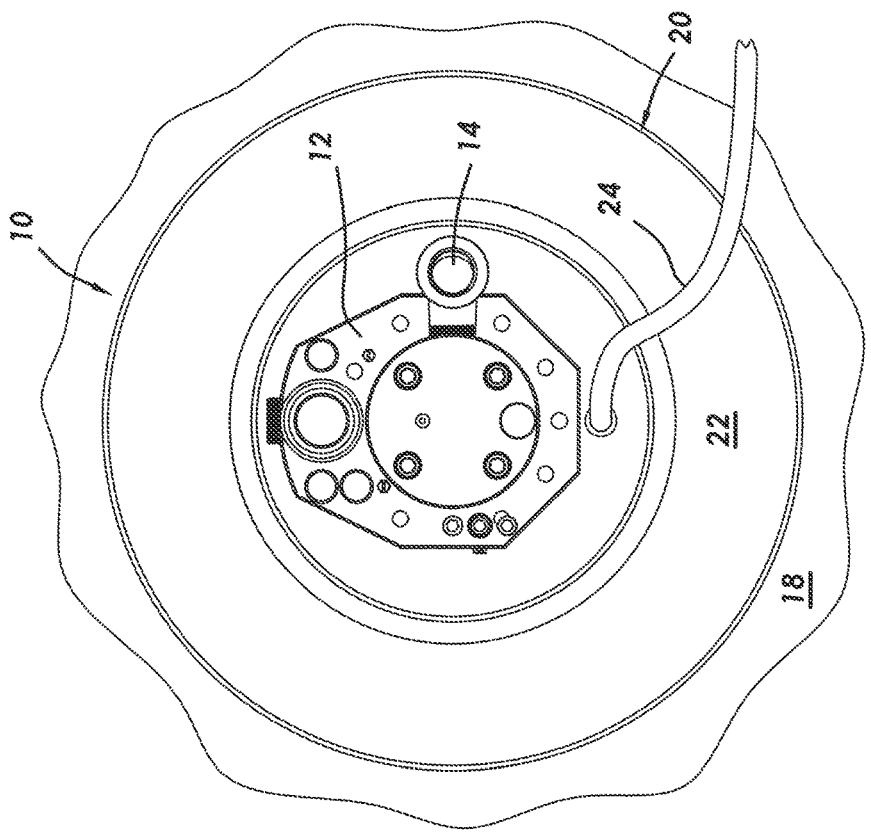
FIG. 1B (PRIOR ART)
FIG. 1A (PRIOR ART)

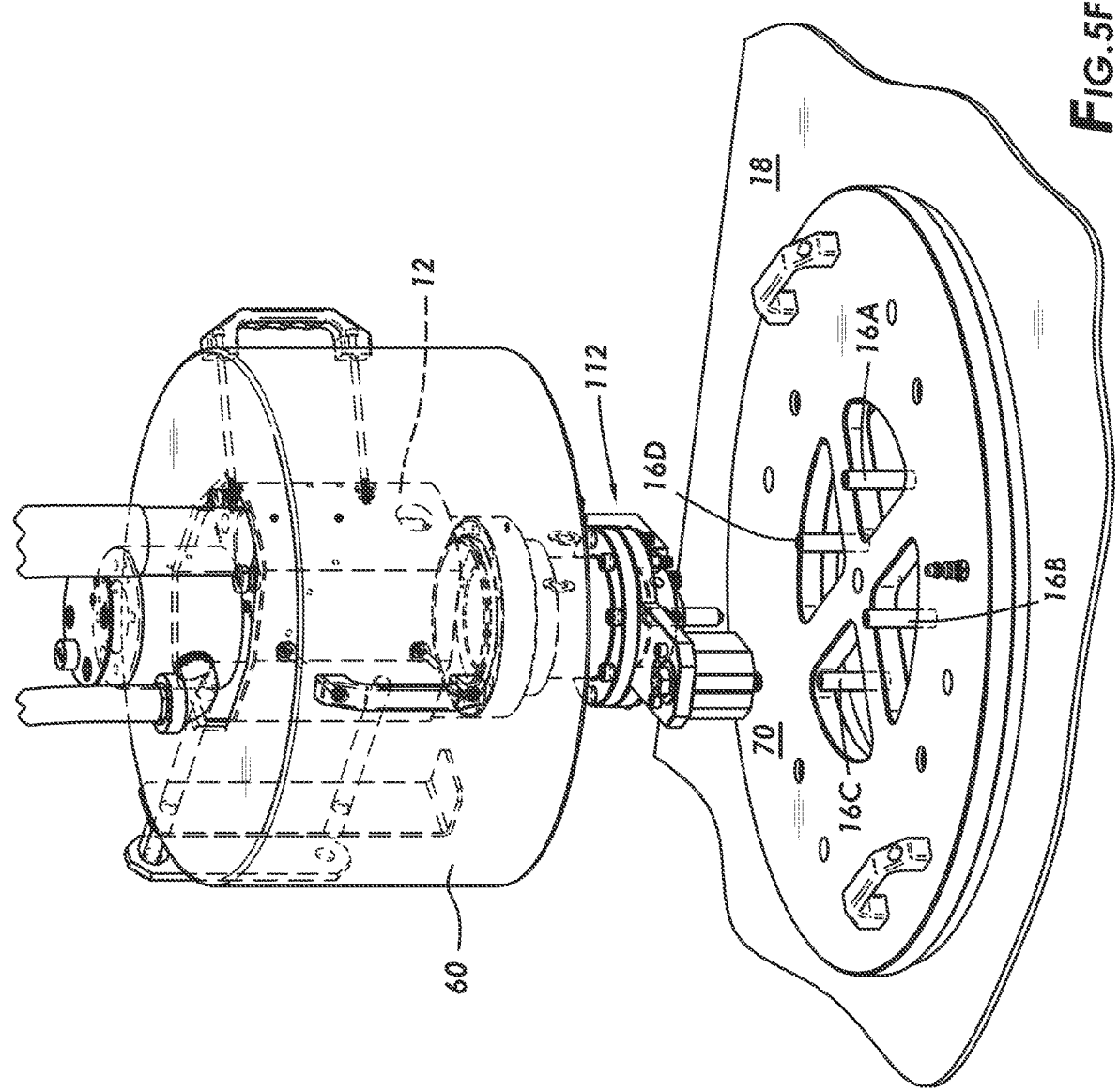

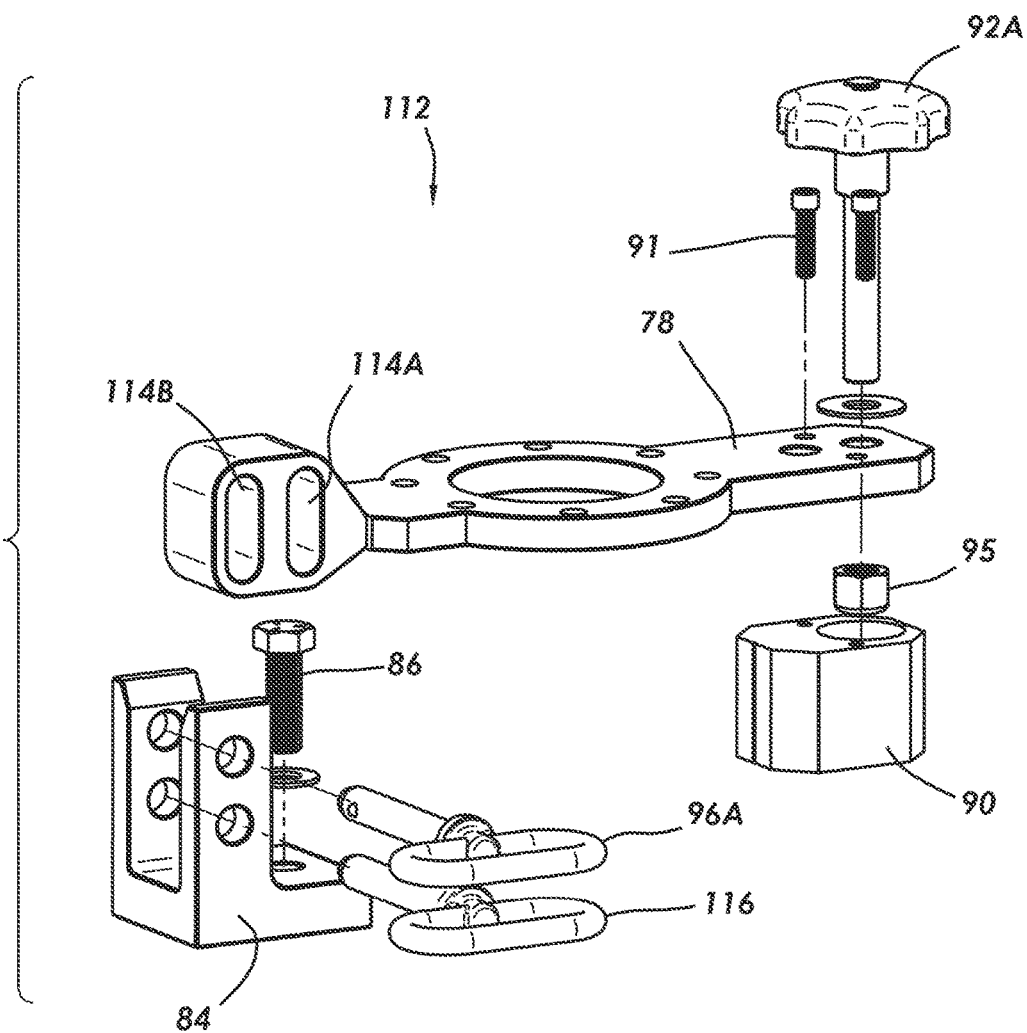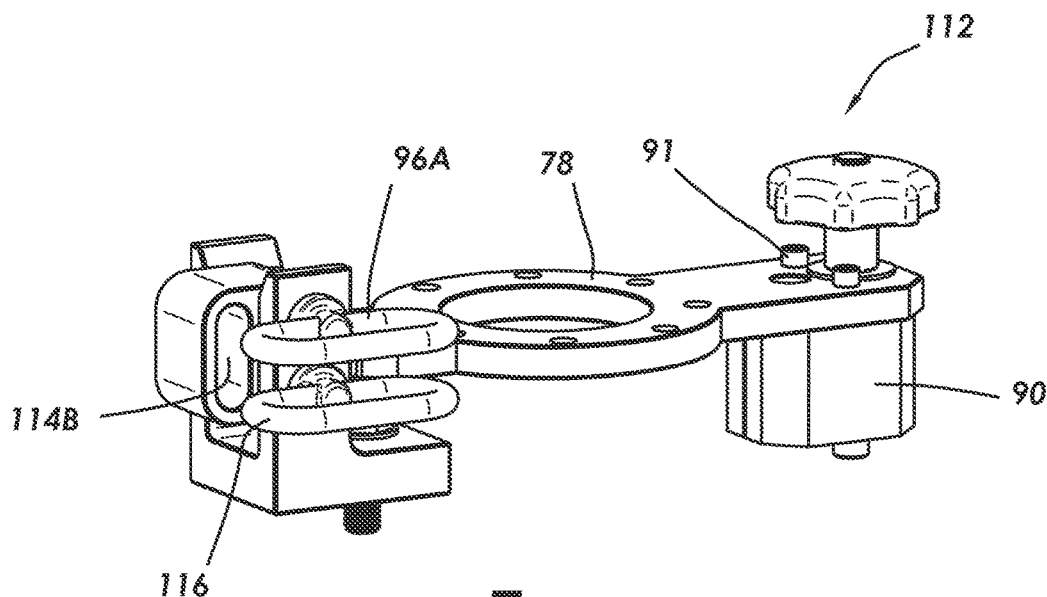

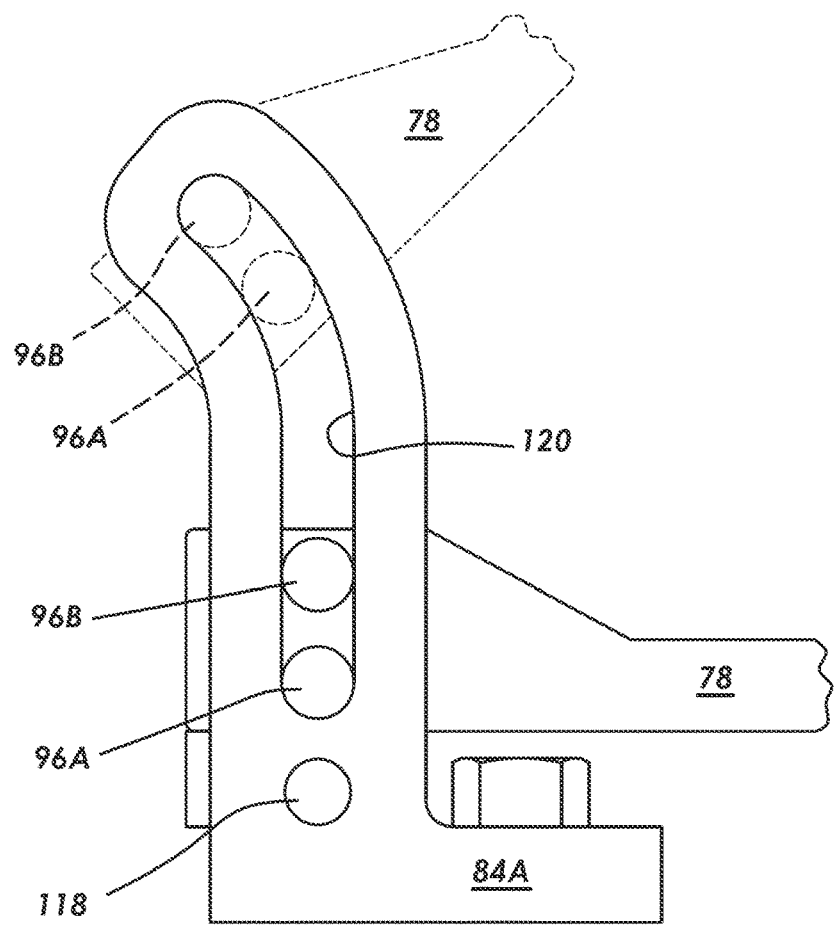
FIG.8A
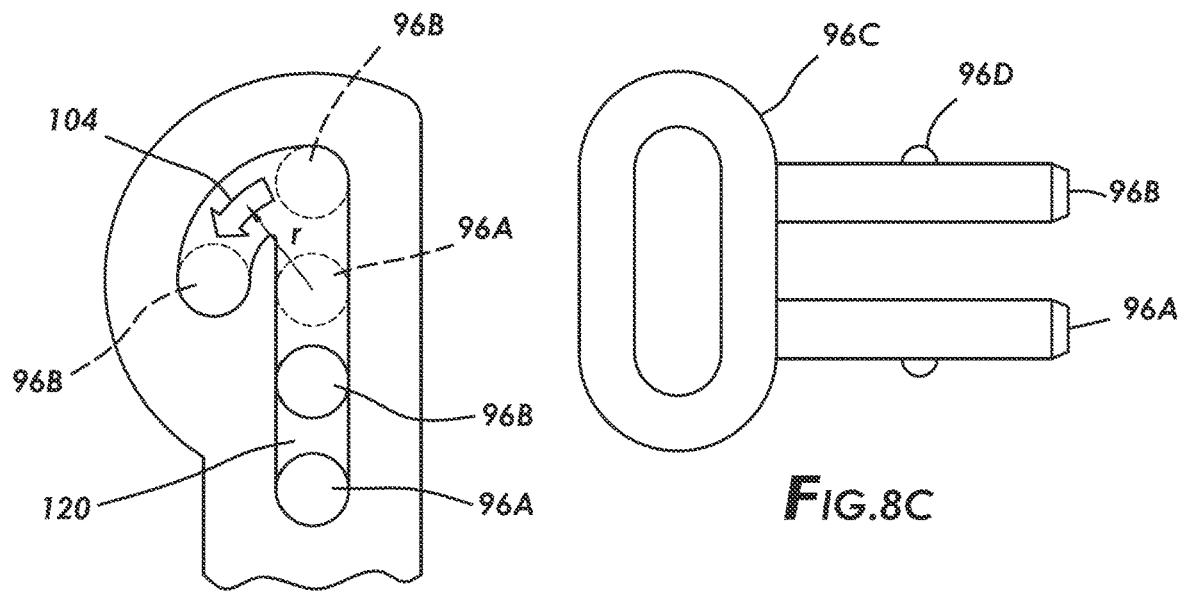
FIG.8B
FIG.8C

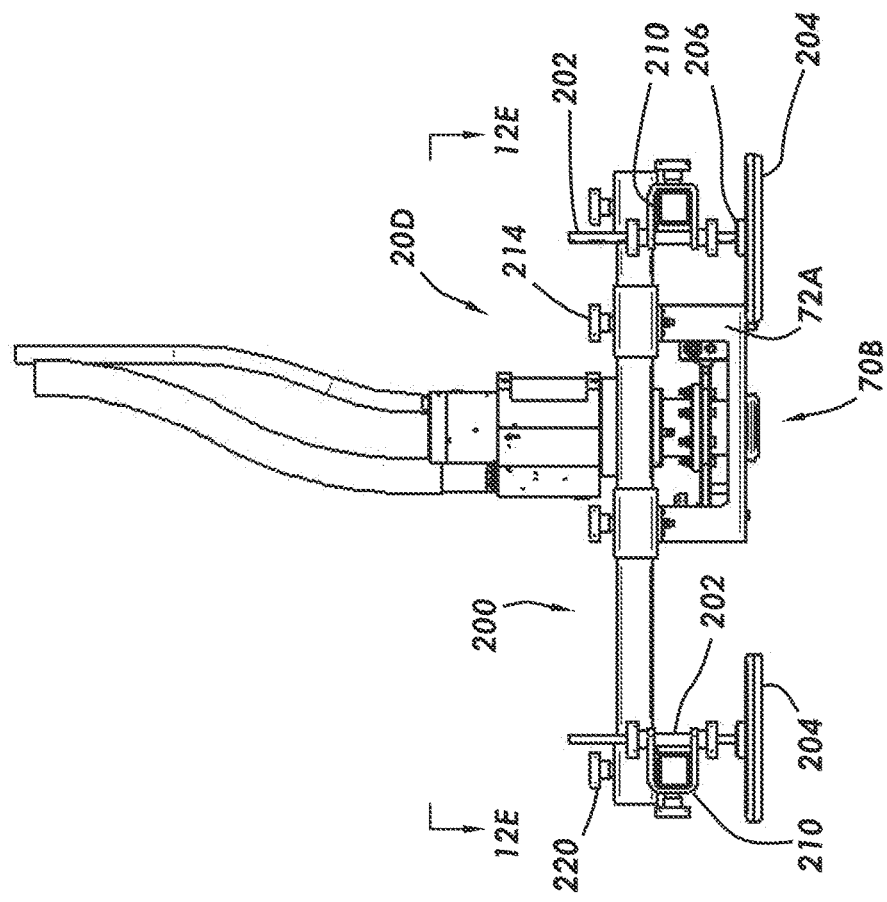
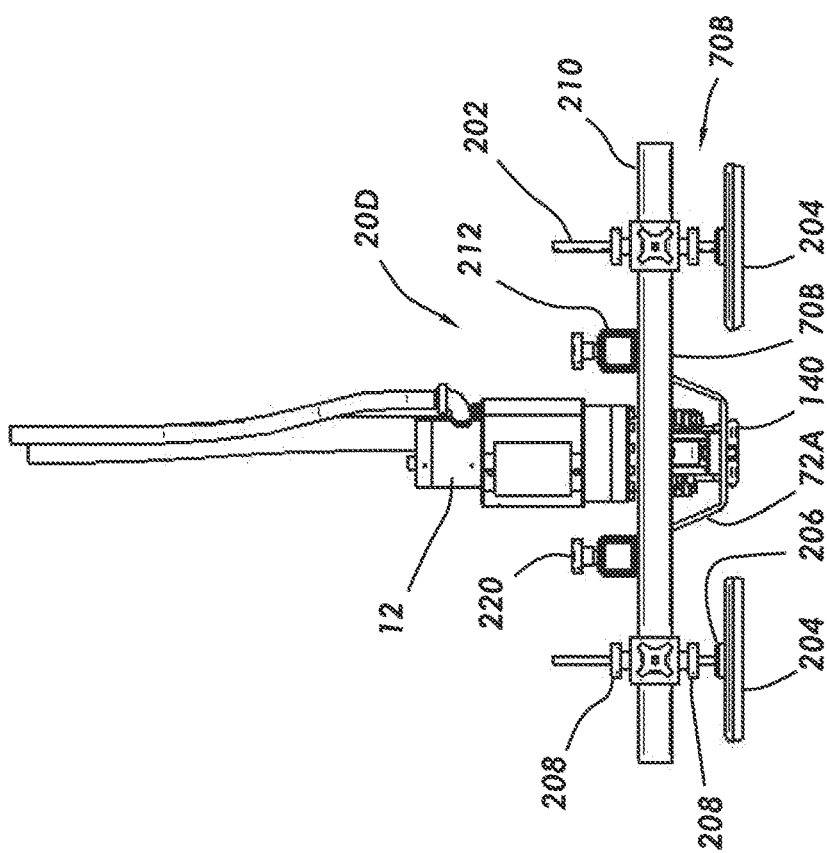
FIG.12D
FIG.12C

MULTI-POSITION CLAMP FOR FRICTION WELDING OPERATIONS

RELATED APPLICATION

This application is an application under 35 U.S.C. 371 of International Application No. PCT/US2020/044423 filed on 31 Jul. 2020, which claims priority from U.S. Provisional Patent Application 62/881,340 filed 31 Jul. 2019, the disclosures of which are incorporated in their entirety by reference herein.

BACKGROUND OF THE INVENTION

The present invention generally relates to a system, method and components for facilitating the joining of multiple fixtures to a substrate, and more particularly, to an indexable multi-position clamp for securing a portable friction welding system to the substrate for installing multiple fixtures to the substrate in a precise pattern.

Broadly, friction welding is a process for joining materials using a combination of pressure and movement at the interface of a fixture to be joined and a substrate. Typical fixtures include externally threaded studs and internally threaded bosses through which other equipment can be securely mounted to the substrate. Friction induced heat from rotating the fixture while thrust against the substrate to which it is being joined provides a very rapid, very localized heating. After the materials at this intersection have plasticized, rotation stops, and forging pressure holds the fixture against the substrate until the localized plasticized material fully solidifies and the weld is complete. After set-up at location, this friction welding process takes only a few seconds from start to finish to join a fixture to the substrate. Recent improvements in automation have allowed the introduction of portable friction welding systems as versatile tools that can deliver efficient, consistent, high-quality welds in the hands of tradesmen requiring general skill levels readily available in the welding trade. Nevertheless, the application of these tools remains hindered for applications requiring a tight array of precisely spaced fixtures due to a lack of suitable clamping options.

Controlling the thrust at the interface of the fixture and the substrate during the friction welding process has been addressed with various clamping systems that hold the portable friction welding system securely to the substrate. This works well for the single shot installation where one fixture will mount the desired equipment, e.g., placing anodes to cathodically protect the substrate. Yet many operations require the installation of equipment having multiple holes through their base to accept externally threaded studs. The installation of such equipment requires providing an array of studs with precise spacing that will align with these holes. Installing pad eyes on heavy equipment that must be lifted or retrieved is one example and pre-drilled repair panels provides another example of installations requiring multiple fixtures in a precise pattern. However, the size of the footprint of the clamp and a need for repeated and precise clamp placement are problematic where tightly spaced and precisely located fixtures are required.

Other clamp systems have been devised that mitigate problems with the footprint size and the precise placement through the use of a clamp having multiple, pre-spaced ports at which the portable friction welding system is attachable. However, fully detaching the portable friction welding tool, sealing the old port, opening a new port, relocating and reattaching the portable friction welding tool at the new port, through each fixture installation in the array, remains quite cumbersome. And some applications such as those involving underwater diving operations in current or low visibility conditions can seriously exacerbate these problems.

In addition, the current practice to fully detach the portable fiction welding tool from the substrate in order to load each successive fixture in the collet of the portable fiction welding tool further contributes to the present inefficiencies affecting installation of multi-fixture arrays.

Therefore, there remains a substantial need for a clamp system with more efficiency, ease of use and repeatable precision for positioning and holding a portable friction welding tool to a substrate for the installation of multiple fixtures in a precise pattern.

BRIEF SUMMARY OF THE INVENTION

To achieve these and other advantages in accordance with the purposes of the present invention, as embodied and broadly described herein, the present invention relates, in part, to an indexable, multi-position clamp for positioning and holding a portable friction welding tool adjacent a substrate for friction welding a plurality of fixtures in a precise pattern referenced from a fixed position on a substrate. The clamp has a clamp base temporarily securable at the fixed position on the substrate, a traveling mount comprising a tool mount for receiving said portable friction welding tool, and a connection to the clamp base allowing relative movement of the tool mount over the substrate. Indexed positions are accessible with the relative movement of the tool mount over the substrate whereby the precise pattern for the plurality of fixtures is referenceable from the fixed position of the clamp base on the substrate. An articulated fixture loading system engages the tool mount in a manner so as to allow reorientation of said mounted portable friction welding tool when mounted in said tool mount to a position allowing access for loading a sequence of fixtures without disengaging and removing said portable friction welding tool from connection with the clamp base.

Another aspect some embodiments of the present invention is a method for friction welding a plurality of fixtures to a substrate in a precise pattern referenced from a selected fixed position on the substrate. This method comprises temporarily securing a clamp base at the selected fixed position on the substrate for the precise pattern of the fixtures and attaching said portable friction welding tool to a traveling mount providing a fixture loading system. The traveling mount is attached to the clamp base through a connection allowing relative movement of the portable friction welding tool over a plurality of indexed positions relative to the substrate. The portable friction welding tool is moved to a first selection from among the indexed positions relative to the substrate and the travelling mount is locked in that position for installing one of the fixtures at a first indexed position within the precise pattern. The portable friction welding tool is articulated using the fixture loading system to reorient the position of the portable friction welding tool so as to allow access for loading a next fixture into a collet without disengaging and removing said portable friction welding tool from connection with the clamp base. The next fixture is installed into the collet and the portable friction welding tool is moved to a next selection from among the indexed positions relative to the substrate, locked, and the next fixture is installed to the substrate.

These steps are repeated to install subsequent fixtures at the subsequent indexed positions until the precise pattern has been completed before the portable friction welding tool effectively disengages from the substrate.

Additional features and advantages of the present invention will be set forth in the description that follows and, in part, will be apparent upon study of the description or can be learned by practice of the invention. The features and other advantages of the present invention will be realized by means of the elements and combinations particularly pointed out in the description and in the claims. Further, it is to be understood that both the foregoing general description and the following detailed description are exemplary and explanatory only and are intended to provide a further explanation of the present invention, as claimed.

BRIEF DESCRIPTION OF THE DRAWINGS

The accompanying drawings, which are incorporated in and constitute a part of this application, illustrate features in various embodiments of the present invention and, together with the description, serve to explain the principles of the present invention. In different figures various features are designated with identical reference numerals and related items are often designated with the same reference and with a letter suffix appended.

FIG. 1A is a top elevational view of portable friction welding tool mounted to vacuum clamp of the prior art;

FIG. 1B as a side elevational view of the portable welding tool and attached prior art vacuum clamp FIG. 1A;

FIGS. 5A-5F illustrate perspective views of steps in using the vacuum clamp system illustrated in FIG. 4A;

FIG. 7A is an exploded perspective view of an alternate embodiment a rotating lug and pivot plate assembly accommodating both vertical lift and multiple diameter arrays:

FIG. 7B is a perspective view of the assembled components of the embodiment of FIG. 7A;

FIGS. 8A and 8B are side elevational views of alternate embodiments of a rotating lug and pivot plate assembly with constrained vertical lift:

FIG. 8C is a side elevational view of a twin pin for use with embodiments such as FIGS. 8A and 8B;

FIG. 12C is an end elevational view of the portable friction welding system of FIG. 12A taken from line 12C-12C in FIG. 12A;

FIG. 12D is a front elevational view of the portable fiction welding system of FIG. 12B from line 12D-12D in FIG. 12B:

DETAILED DESCRIPTION OF THE INVENTION

Figure 2:
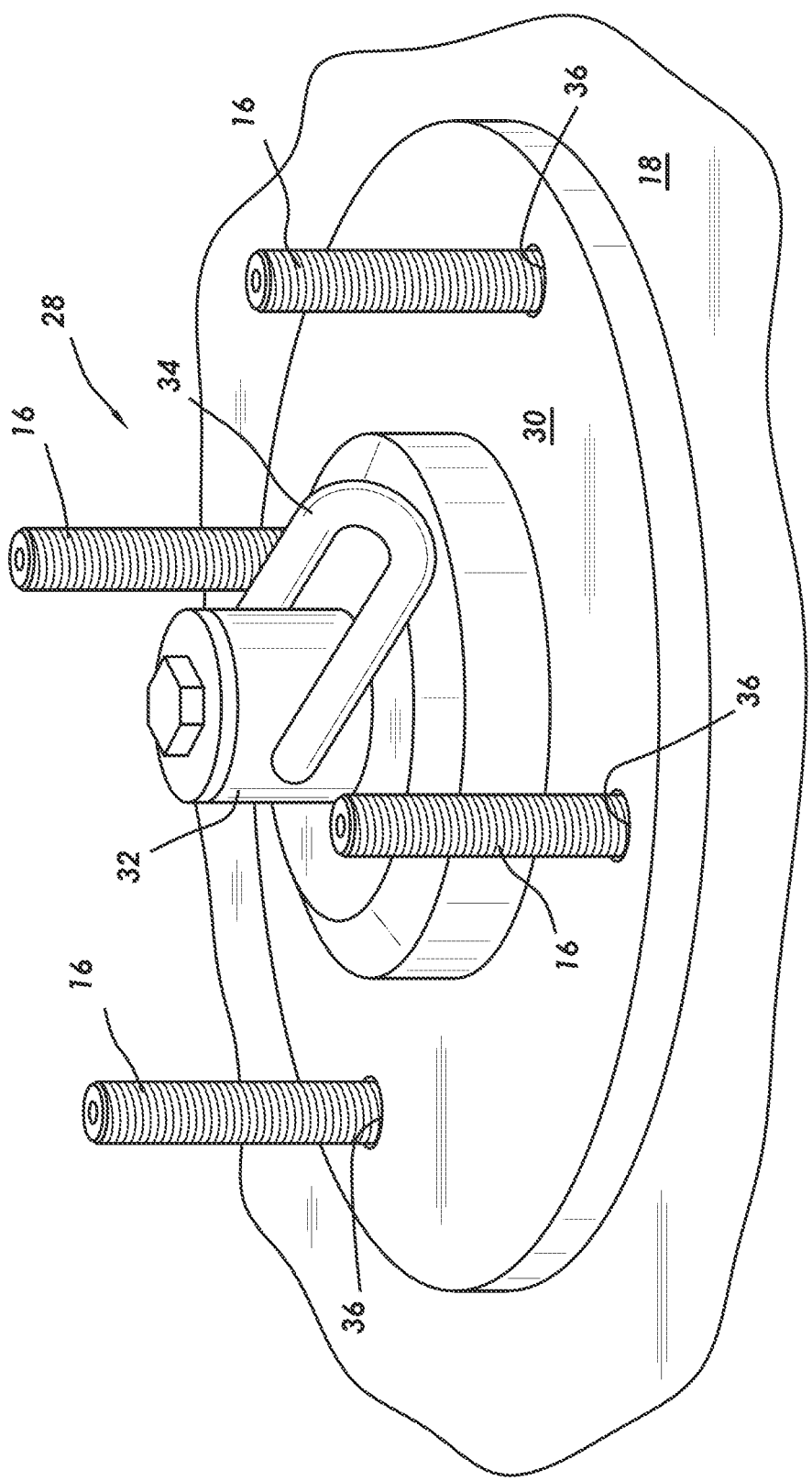
FIG. 2 is a perspective view of a pad eye placed on an array of studs friction welded to a substrate.

FIG. 1A is a top elevational view of a portable friction welding system 10 illustrative of a new generation of systems with automation features for effectively allowing tradesmen of ordinary skill of the welding art to efficiently and consistently produce high quality welds. In this example, portable fiction welding tool 12 receives pneumatic power at input 14 to drive an air mortar, thrust system and control elements of tool 12 which rotate a fixture 16, see FIG. 1B, while thrust against a substrate 18. Considerable thrust must be applied at the intersection of the fixture and the substrate and adequate control of this thrust this is an important component of a successful weld. Here this accomplished by a clamp system 20 of the prior art, with a concave disk 22 sealing against substrate 18 with a vacuum drawn through a vacuum line 24. With clamp system 20 locked against substrate 18, reactive forces are effectively passed to the substrate and thrust force and advancement of fixture 16 into substrate 18 can be controlled by tool 12.

Portable friction welding system 10 of FIGS. 1A and 1B, including prior art clamp system 20, works well for the single shot installation where one fixture will mount the desired equipment, e.g., placing anodes to cathodically protect the substrate. Yet many operations require the installation of equipment having multiple holes through their base to accept externally threaded studs. A pad eye 28 in FIG. 2 is illustrative of such applications. Pad eye 28 includes a base 30, swivel 32 and a load loop 34. Pad eyes are frequently installed where heavy equipment must be lifted or retrieved and base 30 must be securely attached to substrate 18. Holes can be drilled through the substrate and bolts and washers can accomplish this secure connection in some applications. But this is time consuming at best and it may be required or at least very desirable to make this connection without putting holes through the substrate. Friction welding studs to the substrate would be an ideal solution as it is secure, doesn't compromise the integrity of the substrate and, once set up, a connection takes only seconds to bond. The installation of such equipment would require providing an array of studs 16 with precise spacing that will align with mounting holes 36. However, the size of the footprint of the clamp and a need for repeated and precise clamp placement are problematic where tightly spaced and precisely located fixtures are required. For instance, common industrial pad eye 28 presents base 30 with holes 36 about a circumference that requires spacing much closer than the radius of concave disk 22 of clamp system 20. Thus, after the first stud 16 is installed, it interferes with the footprint of clamp system 20 and portable friction welding system 10 of FIGS. 1A and 1B cannot align with the next required location for stud installation.

Figure 3:
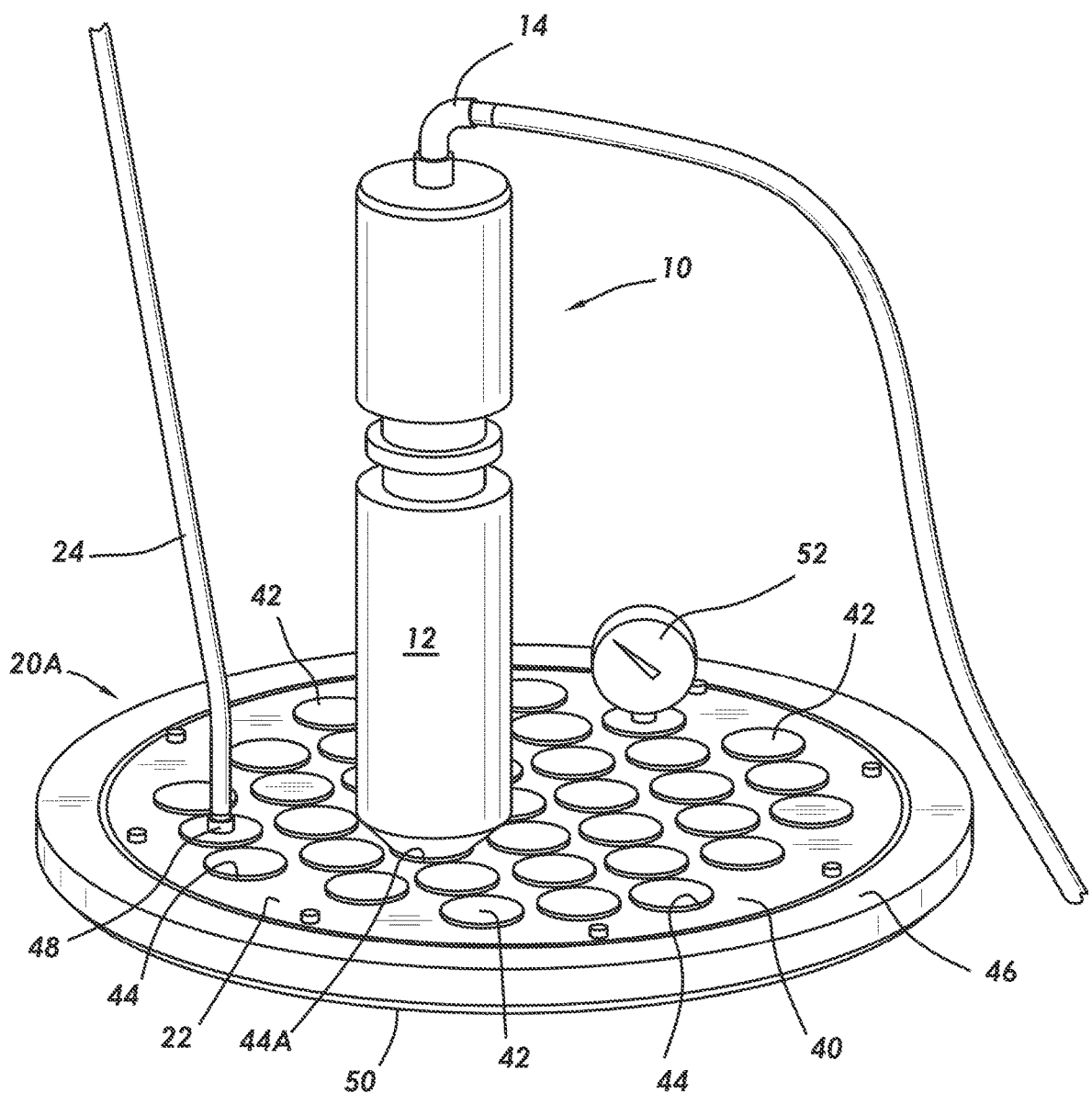
FIG. 3 is a perspective view of a multiport vacuum clamp in the prior art with a portable friction welding tool installed in one of the ports.

FIG. 3 illustrates another portable fusion welding system 10, but with a clamp system 20A of the prior art that accommodates close stud placement, albeit in a very cumbersome way. In this embodiment, the top of concave disk 22 is a strainer plate 40 providing a plurality of closely spaced tapped ports or holes 44, each of which is configured to receive installation of the portable friction welding tool 12 or be sealed by a plug 42. The periphery or outer ring 46 of concave disk 22 bears a gasket seal 50 disposed to engage the substrate when a vacuum is applied, but is otherwise temporally secured to the substrate, e.g., by magnates (not shown), absent a vacuum. One of the plugs 42 is unscrewed from the tapped hole into which it is received and tool 12 is installed in that location. With tool 12 filling tapped hole 42A through strainer plate 40 and the other tapped holes filled by plugs 42, strainer plate 40 is effectively sealed and a vacuum can be drawn through vacuum hose 24 at quick disconnect 48. This may be monitored through a vacuum gage 52. Under the application of a vacuum, clamp system 20A can resist the reactive forces as necessary for portable friction welding tool 12 to friction weld a stud in place at that location, with pneumatic input from power input 14 to drive the air motor and hydraulic input driving an internal ram (not shown) to supply the thrust. After that, vacuum is released and portable friction welding tool 12 is disconnected and removed from strainer plate 40. That plug is replaced, and another stud may be inserted into the portable friction welding tool, the next plug is removed, and the tool is installed at that location. Stud patterns with both close and precise placement may be accomplished through repeating this whole process. However, fully detaching the tool, loading a new fixture in the detached tool, sealing the last tapped hole 44 used with a plug 42, opening a new tapped hole by removing the plug 42 at the next desired location, relocating and reattaching the portable friction welding system at the new location, installing the next fixture at that new location, through each fixture installation in the array, remains quite cumbersome. And some applications such as those involving underwater diving operations in current or low visibility conditions can seriously exacerbate these in what is already a problematic process.

Figure 4A:
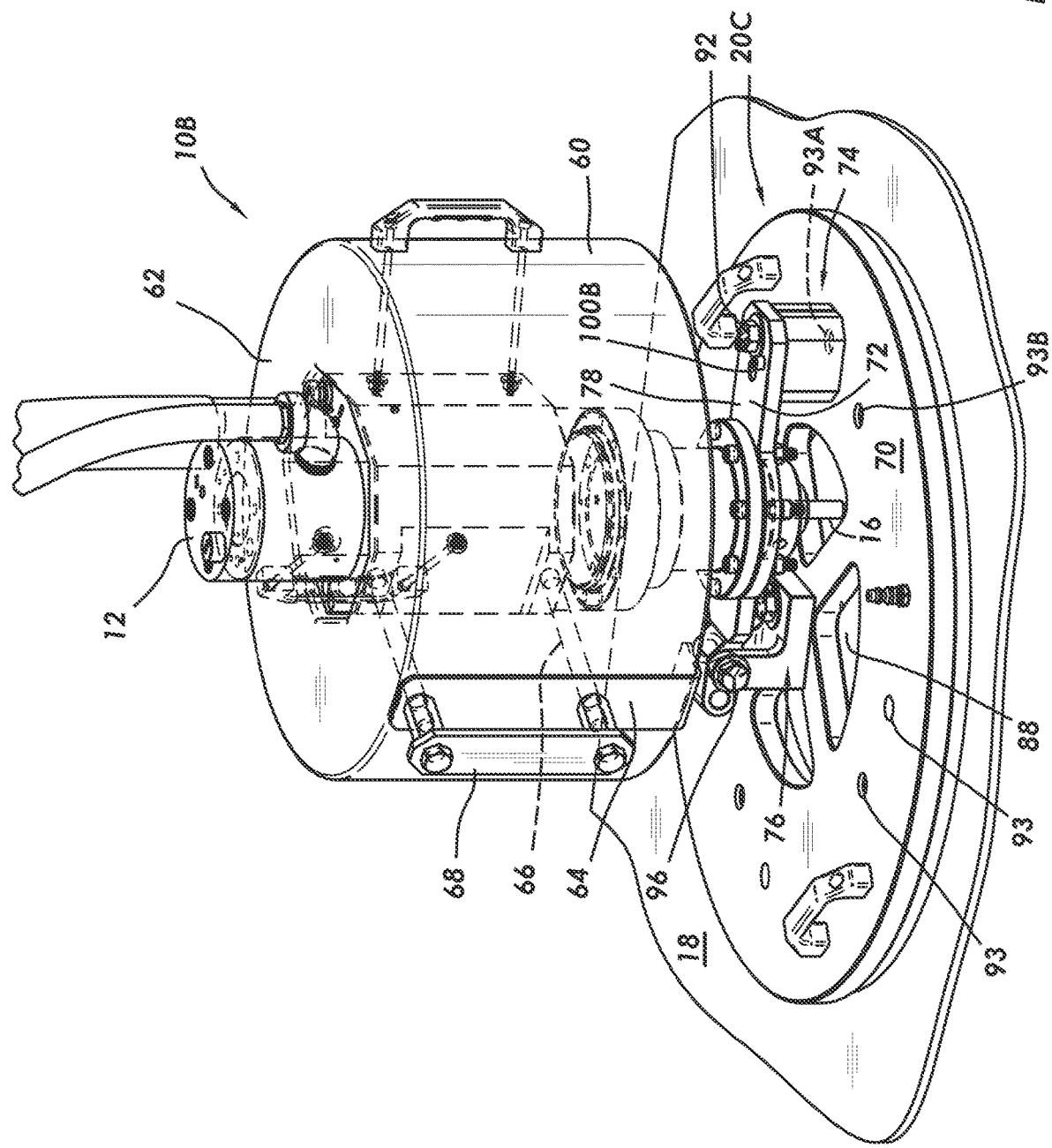
FIG. 4A is a perspective view of a vacuum clamp in a two-pattern embodiment of the present invention.

FIG. 4A illustrates a portable friction welding system 10B constructed in accordance with one embodiment of the present invention and is configured for underwater deployment facilitated with neutral or near neutral buoyancy to portable friction welding tool 12 by virtue of buoyancy device 60. In this embodiment, the buoyancy device includes a jacket of syntactic foam 62 with exterior containment stops at 64 and anchor bolts 66 link the expansive exterior containment stops 64 to the body of portable friction welding tool 12. The expanse of exterior containment stops may be conveniently provided by the facing surface of handles 68 secured to buoyancy device 60 through anchoring bolts 66.

Clamp system 20C of FIG. 4A illustrates the present invention with four key components, a clamp base 70 securable to substrate 18, a traveling tool mount 72, an index system 74 interacting with traveling tool mount 72 and clamp base 70 and an articulated fixture loading system 76. As will be set out in further detail throughout the specification, the present invention is a multi-position clamp facilitating the precise placement of an array of multiple fixtures from one engagement of clamp base 70 to substrate 18 and using that connection to index multiple fixture installations without disengaging and removing portable friction welding tool 12 from clamp base 70 for relocation or for reloading successive fixtures. Clamp base 70 has multiple windows 88 through which portable friction welding tool 12 may reach through clamp base 70 for fixture 16 to reach substrate 18.

Figure 4B:
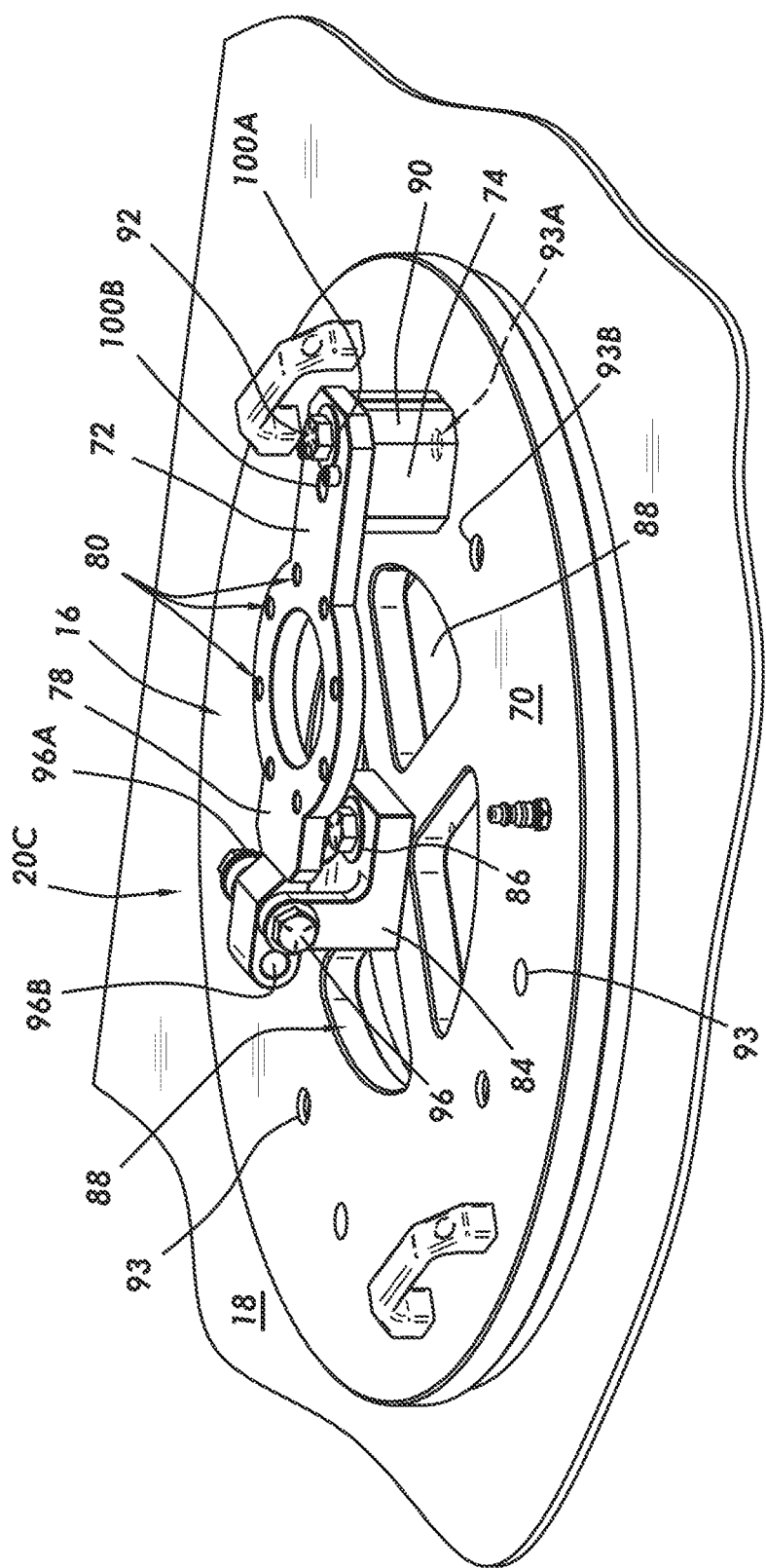
FIG. 4B is a perspective view of the clamp assembly of FIG. 4A with the removal of the portable friction welding tool for the purposes of clarity in illustration.
Figure 4C:
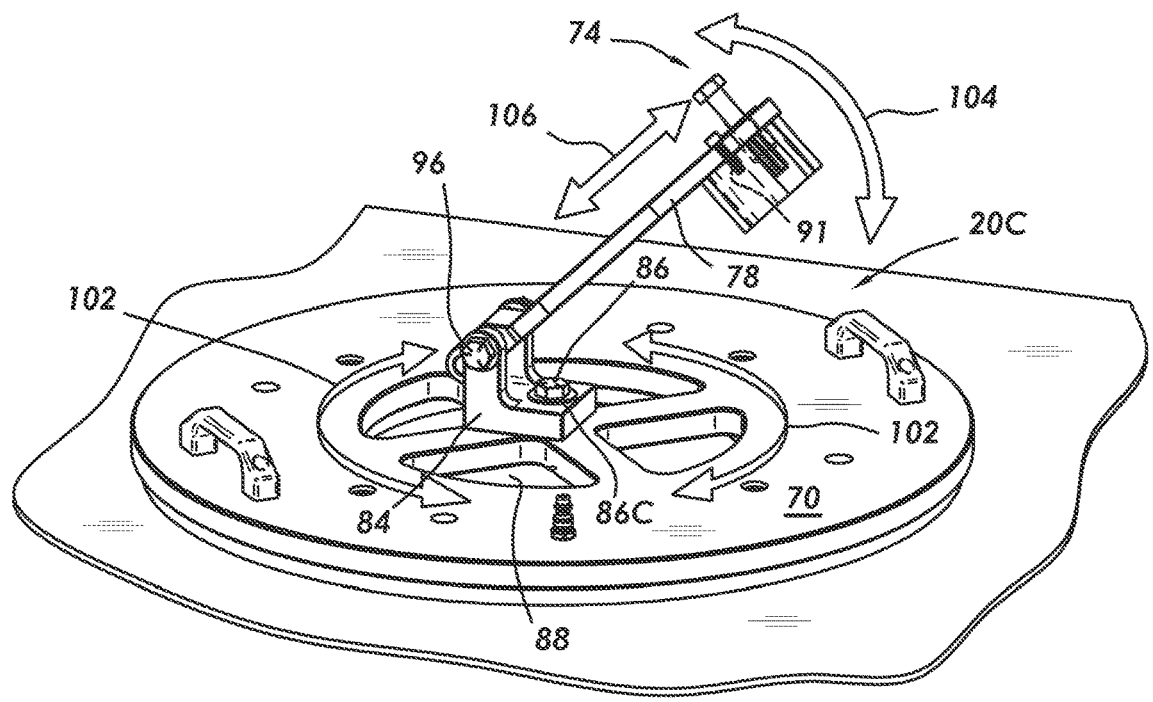
FIG. 4C is a perspective view of the clamp assembly of FIG. 4B illustrating the degrees of freedom afforded this clamp assembly.

FIGS. 4B and 4C illustrate these key components of clamp system 20C in the context of this particular embodiment. Portable friction welding tool 12 and its surrounding buoyancy device 60 have been omitted from these illustrations for the sake of clarity. In this embodiment, traveling tool mount 72 is provided by pivot plate 78 which includes provisions, e.g., tool mount holes 80, for receiving portable fiction welding tool 12.

In FIG. 4B, index system 74 includes rotating lug 84, rotation bolt 86, bearing block 90, bearing block hold fast 91, captivated bolt 92, and multiple tapped holes 93 which serve as index positions to receive bolt 92 at preselected positions around the periphery of clamp base 70. Here are the index system further includes the versatility of adjustments in the diameter of the precision fixture placement pattern by engaging a different pattern position hole, e.g., moving pivot bolt 96 from pattern position hole 98A to 98B (with a corresponding shift of captivated bolt 92 from tapped holes 93 of hold down position 100A to 100B) allows one clamp system 20C to install multiple diameter patterns. This provides index capabilities in a polar reference system of preset angles and radius options.

Articulated fixture loading system 76 utilizes the hold down aspects bearing block 90, bearing block hold fast 91, captivated bolt 92 and pivot bolt to rotatively engage pivot plate 78 to rotating lug 84.

Arrows 102 in FIG. 4C indicate the freedom of rotation of indexing system 74 through the engagement of rotation bolt 86 with clamp base 70 and rotating lug 84 to move from one fixture position, e.g. at first tapped hole 93A, for the next, e.g., second tapped hole 93B, each position indexed from the initial placement of clamp base 70. And arrow 106 illustrates the optional freedom to adjust the diameter of the pattern. Similarly, arrow 104 indicates the hinged movement of pivot plate 78 through its connection to rotating lug 84 which allows the pivot plat to flip up and permit convenient access to load successive fixtures.

In an alternate embodiment, rotation bolt 86 is replaced with a stud 86A installed on clamp base 70 and rotative log 84 is rotatively secured through washer 86C and lock nut 86B. Compare FIG. 9A.

FIGS. 5A-5F set out the steps of practicing one illustrative use the present invention. Clamp base 70 it is installed at the desired target site of substrate 18 in FIG. 5A, aligning fixture placement in the pattern with access windows 88. In this embodiment client base 70 is secured by a continuous vacuum drawn through vacuum line 24 connected the clamp base at vacuum hose quick disconnect 48. Gaskets 50A seal the periphery and the access windows of clamp base 70 against substrate 18.

It is convenient to assemble buoyancy device 60 about portable frictional welding tool 12 and attach pivot and rotation hardware assembly 112 to the portable fiction welding tool on the surface. See FIG. 5B. The rotation lug 84, pivot bolt 96, bearing block 90 and captured bolt 92 are also conveniently connected to pivot plate 78 on the surface and this complete assembly is brought by the diver to clamp base 70 where it is attached using only rotation bolt 86 through which it is secured in a rotatable engagement. Vacuum line 24 has been omitted from vacuum line quick disconnect 48 in these drawings for the purposes of clarity.

Figure 9A:
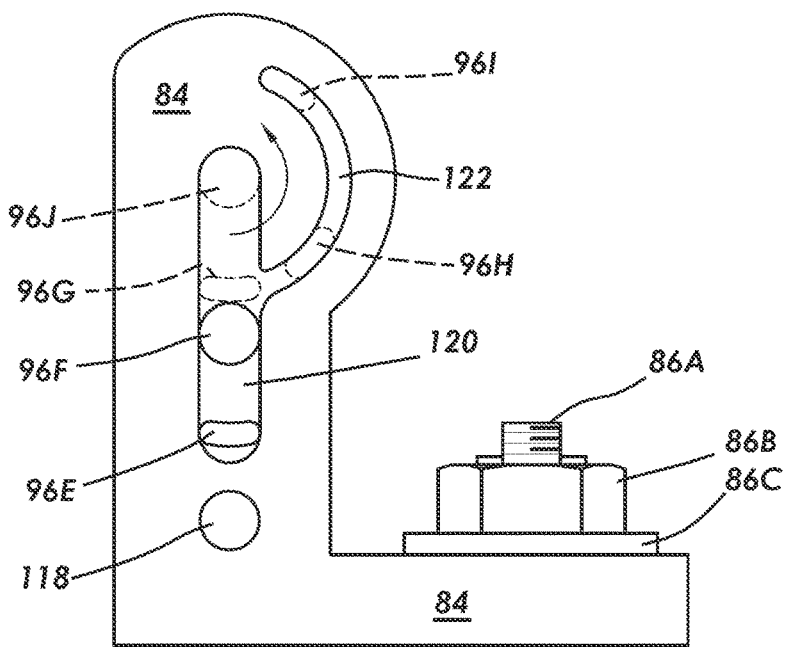
FIG. 9A is a side elevational view of a further alternate embodiments of a rotating lug and pivot plate assembly with constrained vertical lift and components therefore.

Alternatively, the assembled portable friction welding system 12/clamp system 20 can be brought as a unit to attach to the substrate, e.g., in stud/lock nut engagement of rotating lug 84 disclosed in FIG. 9A.

Figure 5A:
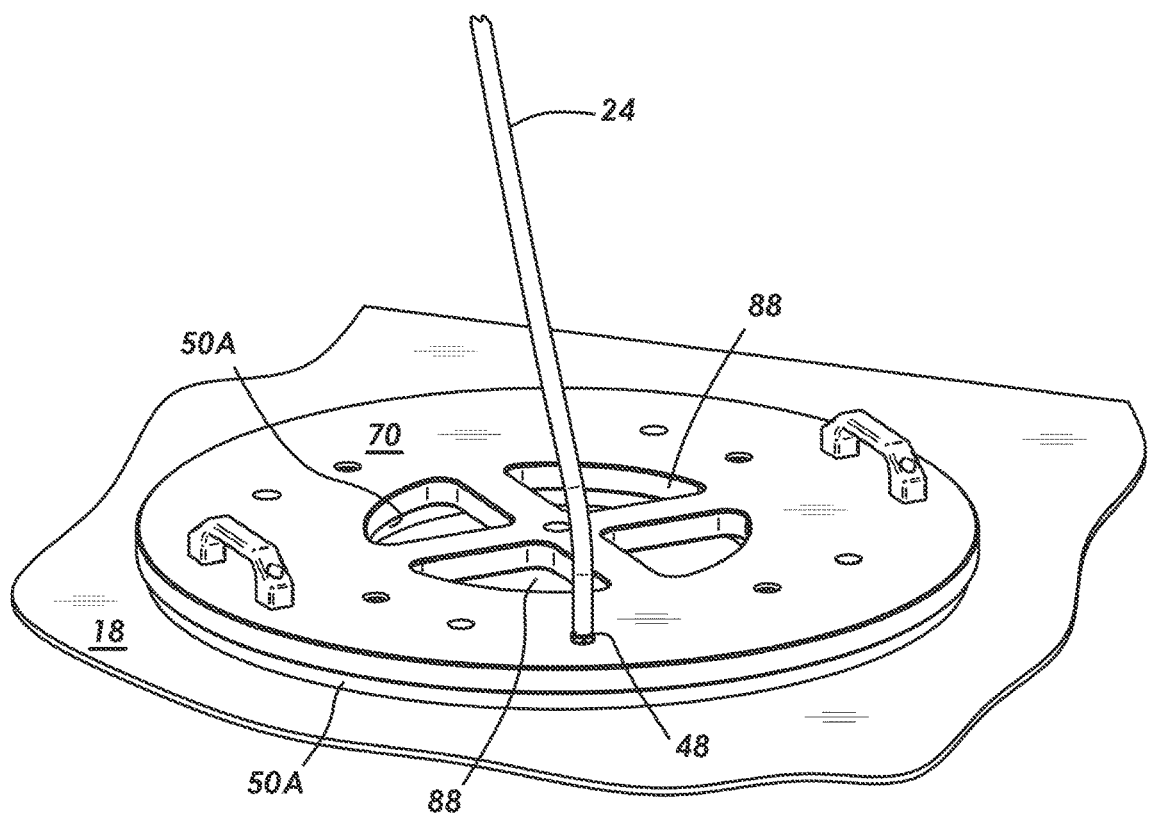
Figure 5B:
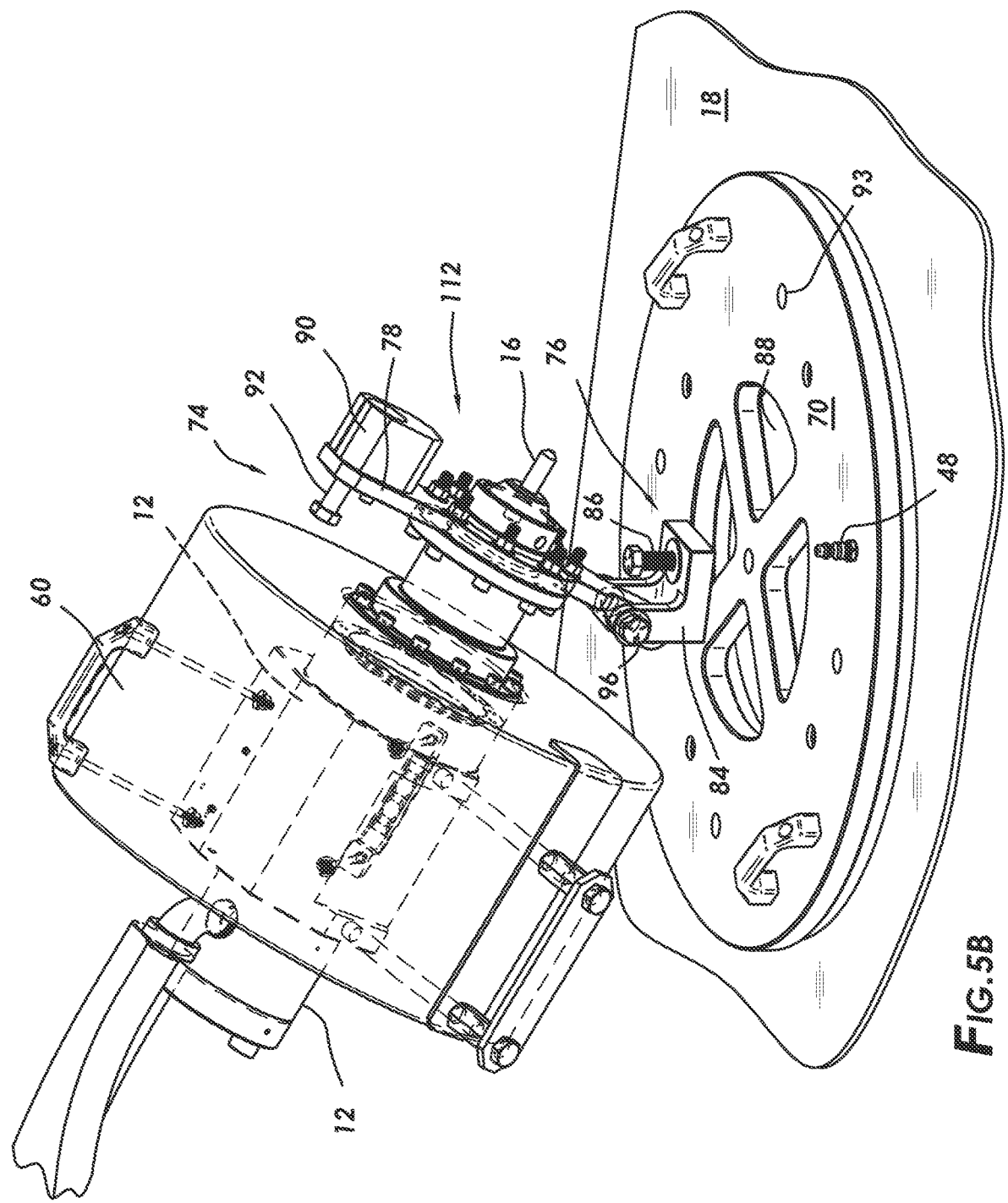
Figure 5C:
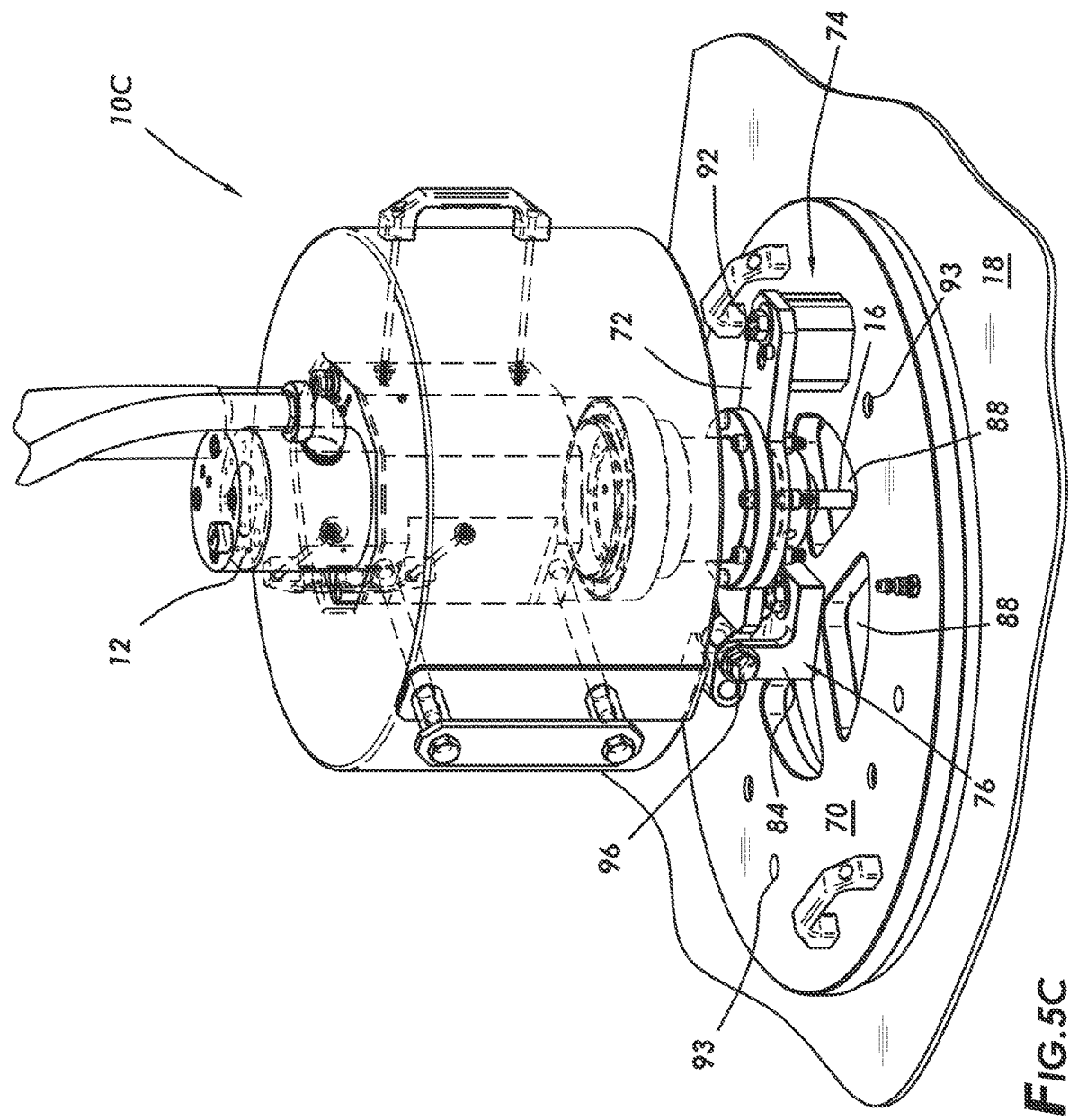

FIG. 5C illustrates portable friction welding system 10C ready to shoot at weld fixture 16 to substrate 18. Captivated lock down bolt 92 has been tightened to secure traveling mount 72, indexing system 74, articulated fixture loading system 76 and the attached portable friction welding tool 12 to clamp base 70.

Figure 5D:
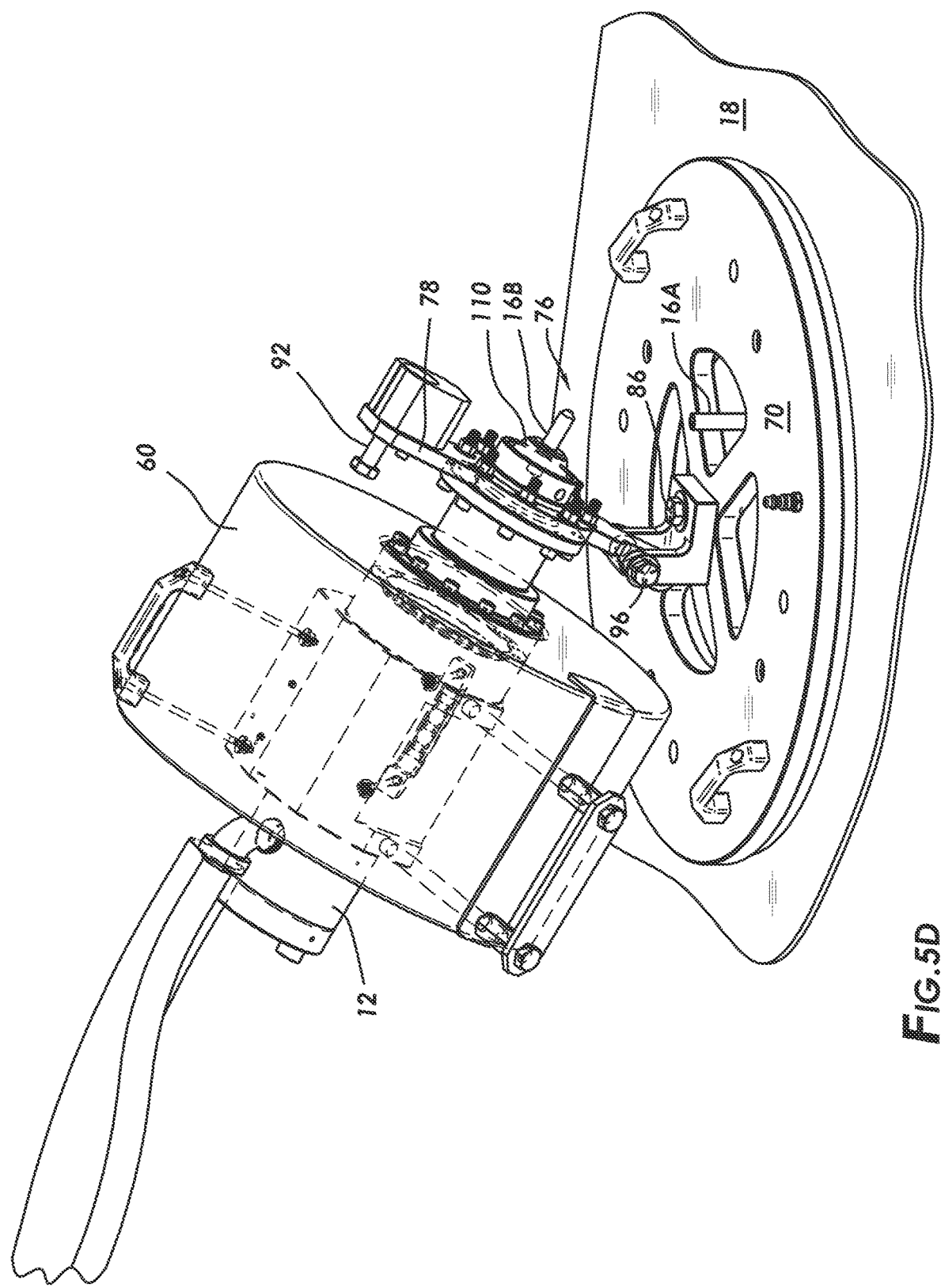
Figure 5E:
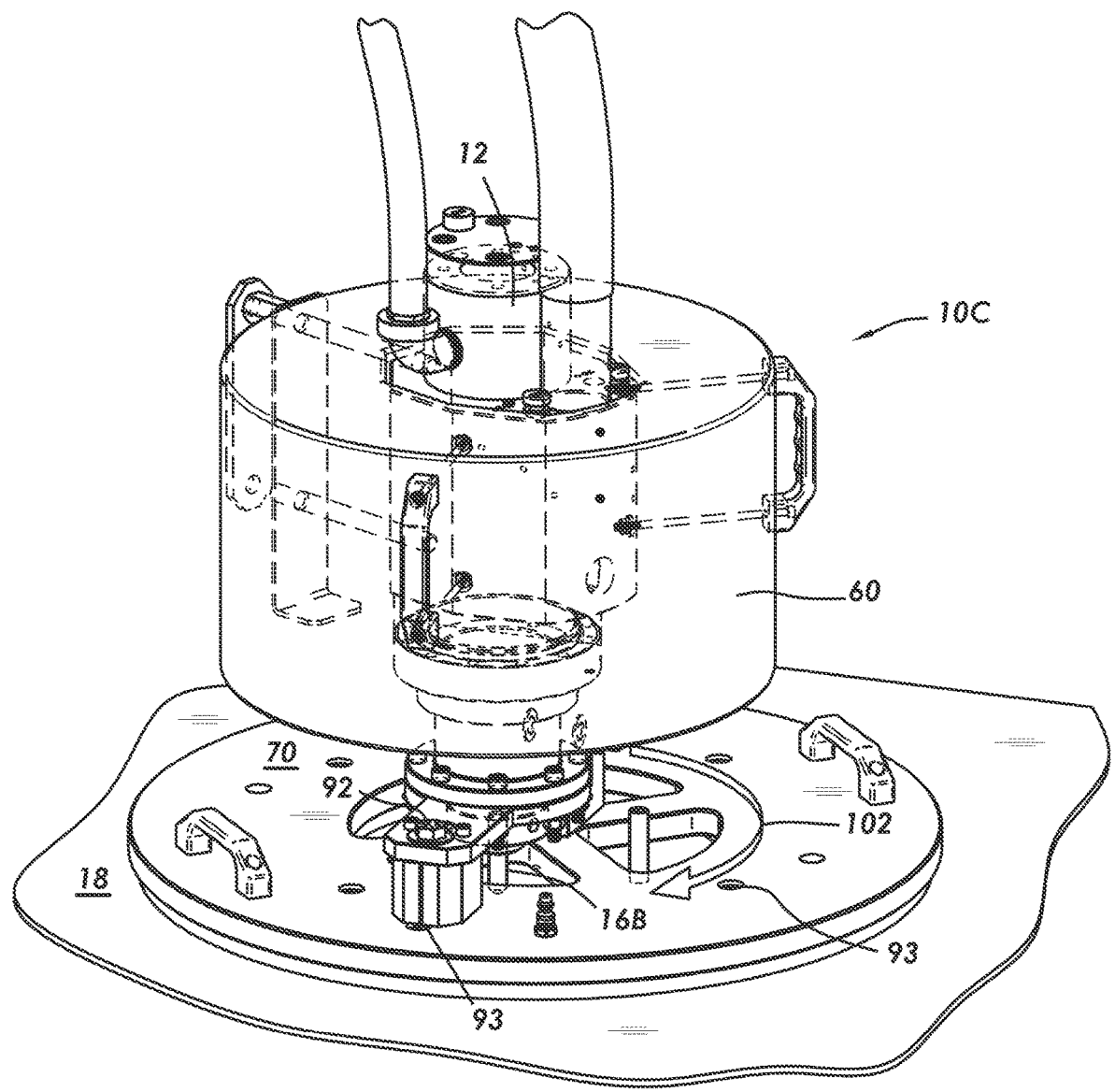

The initial fixture 16A has been installed in FIG. 5D and articulated fixture loading system 76, here the release of captivated hold down bolt 92 and the pivoting of the pivot plate 78 about pivot bolt 96, swings portable friction welding tool 12 up to disengage from fixture 16A initially installed to the substrate and allows access to install a second fixture 16B in collet 110 of friction welding tool 12. Note that portable friction welding tool 12 does not need to be disengaged from its connection to clamp base 70 in order to reload another fixture for installation into the pattern.

Whether by rotation bolt 86 (visible in FIG. 5D) or stud 86 and lock nut 86 (visible in FIG. 9A), the connection of rotation lug 84 to clamp base 70 is maintained loose enough to allow rotation to the next fixture position in the pattern as the as pivot plate is swung over. See arrow 102 of FIG. 5E. Captivated hold down bolt 92 is tightened into tapped hole 93 in clamp base 70 to finish advancement to the next indexed location and portable friction welding system 10C is ready to friction weld the next fixture in the pattern. This process is repeated, all without having to disengage and remove the portable friction welding tool 12 from the reference position of clamp base 70 secured to substrate 18 until the pattern is complete. See FIG. 5F with a complete pattern of fixtures 16A-16D. Portable friction welding tool 12, with pivot and rotation hardware 112 is then disengaged from the clamp base. And clamp base 70 may be removed and reengaged at a new position with substrate 18 if further fixture patterns are to be installed.

Clamp base 70 in the FIG. 5 series and in various other illustrative embodiments have been horizontally deployed on top of substrate 18. However, the substrate may be vertical or may be horizontal and accessed from beneath or anything in between. Orientation of pivot and rotation hardware 112 should bear in mind the full effective weight and mass of the hardware and mounted tool 12, together with buoyancy provision 60, if any. For example, in a vertical clamp base attachment, it may be desired that the portable friction welding tool pivot down to a resting position prior to installing the next fixture 16. Alternatively, a neutrally buoyant combination of tool 12, hardware assembly 112 and buoyancy device 60 will have a slight net buoyancy upon pivoting as some of the hardware is support by the clamp base after installation. Here pivoting up would be a stable option. Other circumstances may find it suitable to pivot in a horizontal plane. Those of ordinary skill in the art and having access to the present disclosure may adjust the components to achieve desirable handling characteristics appropriate to the circumstances.

The engagement of a fixture 16 such as for an externally threaded stud or an internally threaded boss within collet 110 is necessarily one of relatively tight tolerances. Lifting through an immediate pivoting action to disengage from the first fixture 16A before loading a second fixture 16B causes an arching motion that can present challenges in disengagement. See FIG. 5D.

Figure 6A:
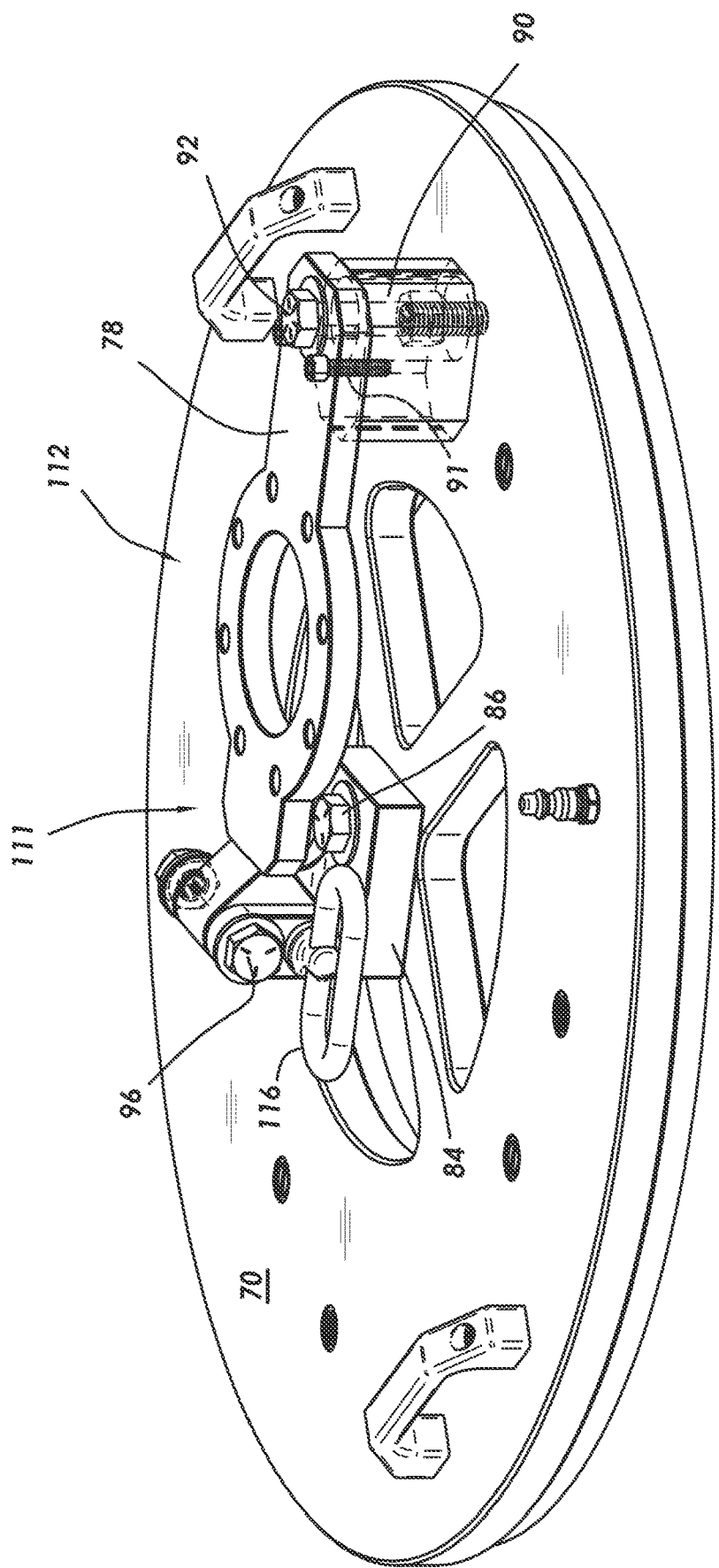
FIG. 6A-6C are perspective views of an alternate embodiment of a rotating lug and pivot plate assembly accommodating vertical lift.
Figure 6B:
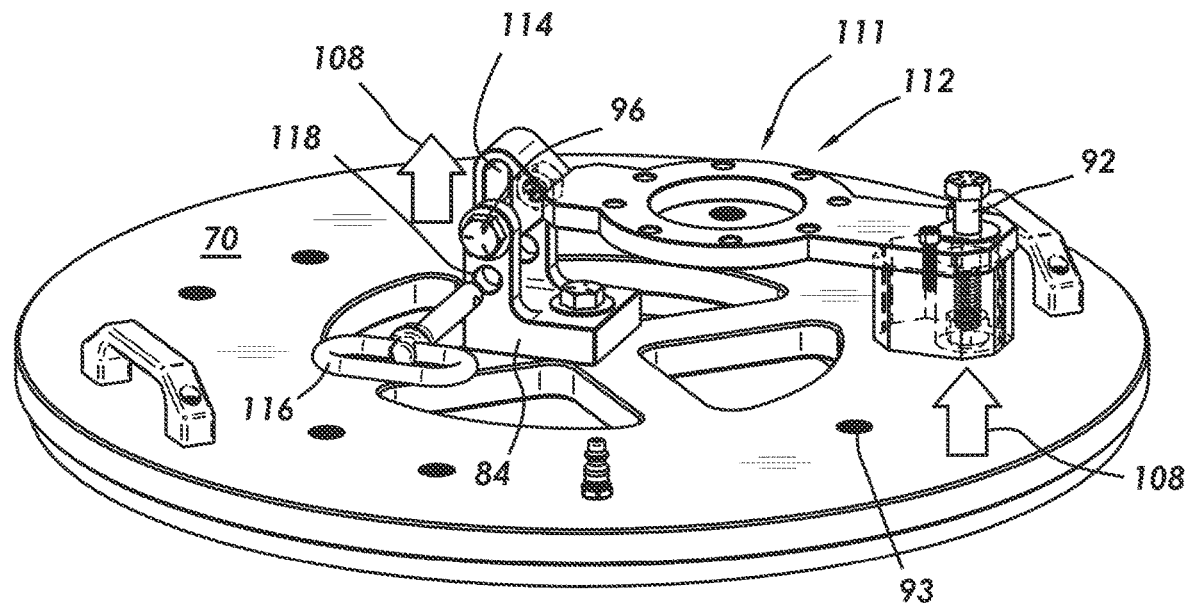
Figure 6C:
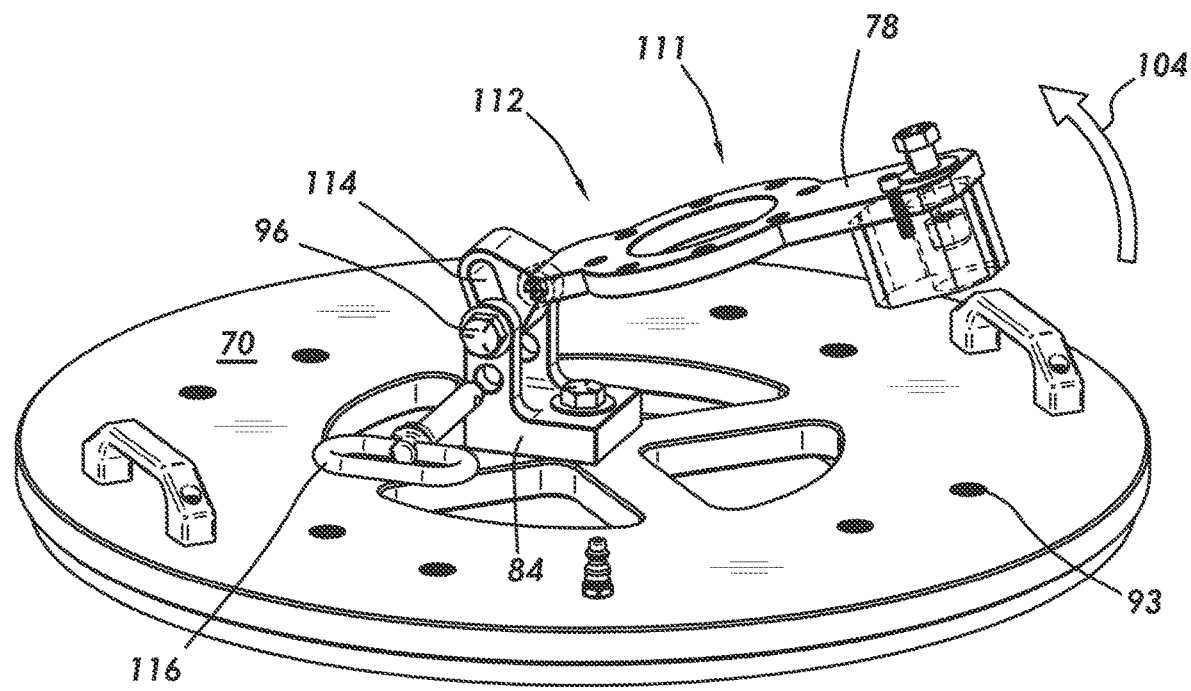

FIGS. 6A-6C present an alternate embodiment that provides the freedom of motion to start with a lift aligned with the axis of fixture 16 to clear the collet/fixture engagement before pivot plate 78 starts the pivoting (see arrow 104 in FIG. 6C). that provides access for loading the next fixture into collet 110. (See FIG. 5C.) Returning to FIGS. 6A-6C, the portable friction welding tool has been removed for the sake of clarity in these illustrations. Again, a rotation bolt 86 secures the indexing and fixture loading system 111, here pivot and rotation hardware assembly 112, to clamp base 70. This hardware comprises pivot plate 78 with bearing block 90 and captivated lock down bolt 92 on one end and pivotable engagement to rotation lug 84 on the other end. Here that engagement includes pivot bolt 96 passing through a vertically elongated reception 114 in at the pivoting base of pivot plate 78. See FIG. 6B. Returning to FIG. 6A, retaining pin 116 passes through pin passage 118 (See FIG. 6A) in rotation lug 84 and through the very bottom of elongated reception 114. Thus, in FIG. 6A, with pin 116 in place and passing through the lowest position of elongated reception slot 114 and the hold down captivated bolt 92 engaged, pivot and rotation hardware 112 is in position to undertake a friction weld. Compare FIG. 6B with pin 116 pulled, hold down captivated bolt 92 disengaged, and a vertical lift (see arrows 108) given to separate the collet from the installed fixture (not shown). Thereafter, pivot plate 78 can be pivoted to gain access to load the next fixture (not shown) as the pivot and rotation hardware assembly is illustrated in FIG. 6C.

It should also be noted that the quality of the resulting weld can be served by controlling the amount of preloading thrust of fixture 16 against substrate 18 by controlling tolerances in connection of rotating lug 84 to clamp base 20 and tightening bearing block 90 against the clamp base.

Figure 7C:
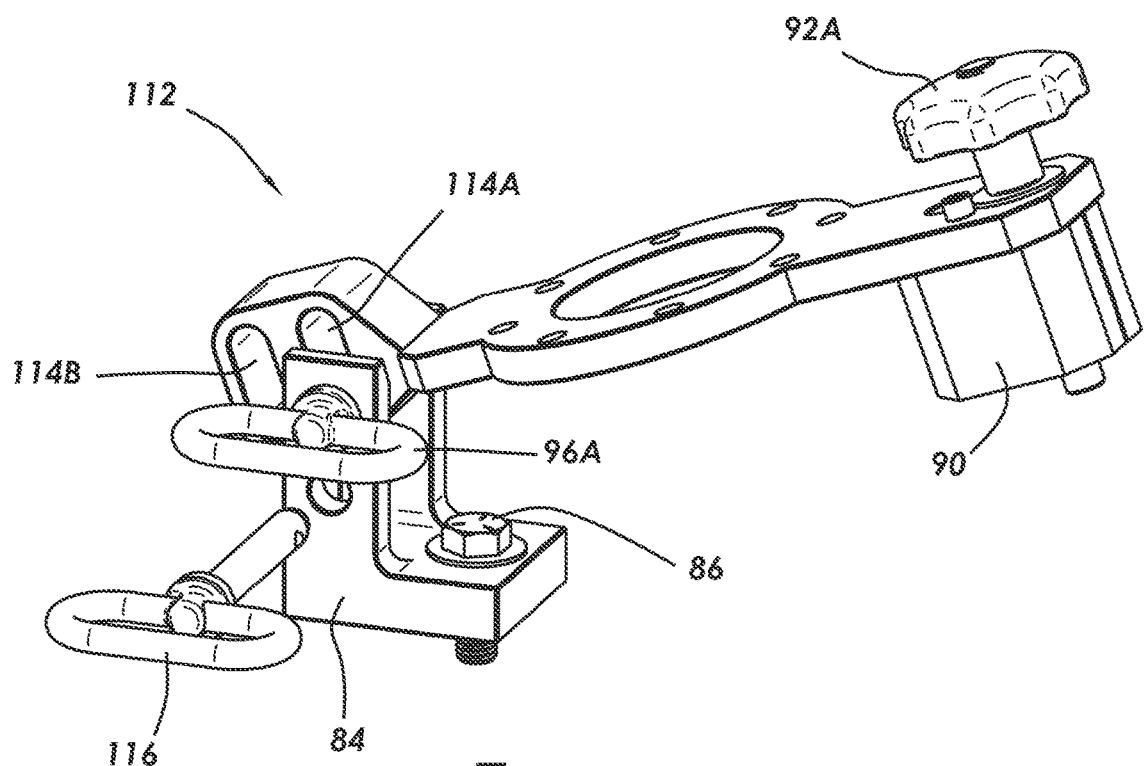
FIGS. 7C and 7D are perspective views of the embodiment of FIGS. 7A and 7B disposed for a short diameter pattern and a longer diameter pattern, respectively.
Figure 7D:
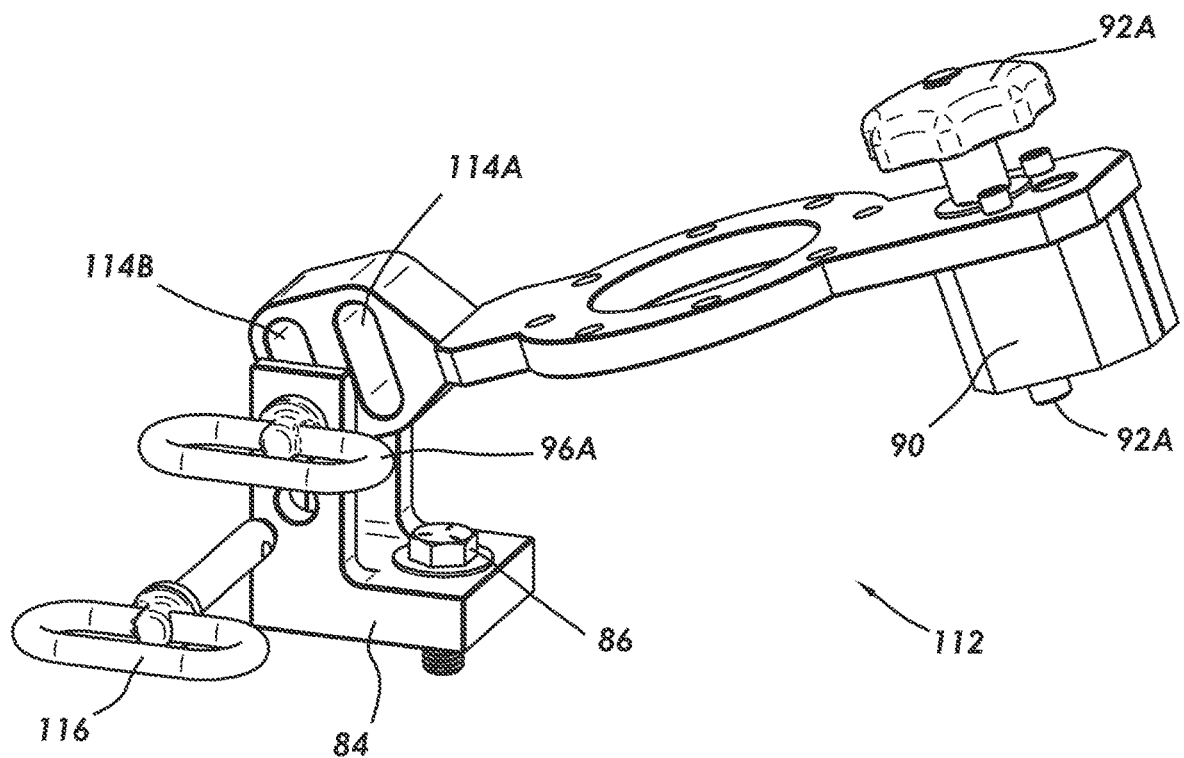

FIGS. 7A-7D illustrate yet another embodiment for the pivot and rotation hardware assembly, here combining vertical lift provisions with multiple diameter pattern capabilities. FIG. 7A is an exploded perspective view of the pivot and rotation assembly 112 and FIG. 7B which illustrates the components assembled in the short diameter pattern position. A key feature of this embodiment is twin vertically elongated reception slots 114A and 114B. Ease of use may also be facilitated by other features of FIGS. 7A and 7B including replacing pivot bolt 96 of the last embodiment with a pivot pin 96A and replacing hold down captivated bolt 92 of the last embodiment with hand screw 92A. FIGS. 7C and 7D should be compared as short and long radius pattern settings with pivot pin 96A engaging elongated reception slots 114A and 114B, respectively. Retaining pins 116 engage the base of the respective elongated receptions for locking down the pivot end of pivot plate 78. Set screws or bearing block hold fast screws 91 anchor bearing block 90 to pivot plate 78, preventing rotation of the bearing block with the turning of captivated bolt 92A such that turning the handle advanced the bolt through captured nut 95.

Further, it should be appreciated that though rotating block 84 is illustrated with ears 84A and 84B which receive the end of pivot plate 78 therebetween, other embodiments of this connection are possible, e.g., providing a single ear on the rotating lug, but split the end of the pivot plate to engage on either side of the rotating lug.

The simple pin adjustment of this embodiment is much easier than disengaging portable friction welding tool 12 from one position on pivot plate 78 to reattach at another to change the radius of the pattern. The efficiency of pin adjustments is particularly advantageous in shooting patterns for applications that require two rows of fixtures in an inner and outer ring pattern.

FIGS. 8A and 8B are close ups of rotating lugs and pivot plate engagements for embodiments that utilize twin pins, preferably disposed on a single handle, which run in tracks in an extension of rotating lug 84A. A pin 116, not shown, through passage 118 through rotating lug 84A and pivot plate 78 can secure that end of the pivot plate in its lowest position, ready to shoot a fixture. Thereafter, pin 116 can be removed. And twin pins 96A and 96B (which replace pivot bolt 96 of prior embodiments) which engage the base of pivot plate 78 and slide through engagement in track 120 of rotating lug 84. Constrained by the track, translation of pins 96A and 96B define the orientation of pivot plate 78. In these arrangements, the pivot plate is not only given the freedom to lift away from the substrate axially aligned with the fixture to clear the fixture/collet engagement, it is constrained to do so. These embodiments differ in that FIG. 8A constrains the twin pins to track together and in FIG. 8B they track together until a tight radius in the track makes pin 96A act as a pivot point as pin 96B orbits to a resting place. See arrow 104. Compare the second, raised position illustrated in dotted outline. Dual radius configurations can be deployed with the addition of a second track.

FIG. 8C is a double pin 96A and 96B, conveniently sharing a common handle 96C. Captured, spring loaded balls 96D may engage radial grooves in pivot plate 78 to help retain the pins in place.

Figure 9B:
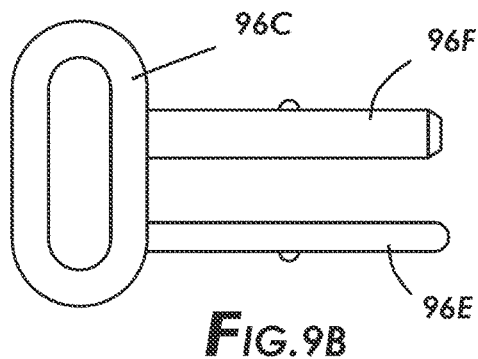
FIG. 9B is a side elevational view of a two-pin configuration for use with embodiments such as FIG. 9A.
Figure 9C:
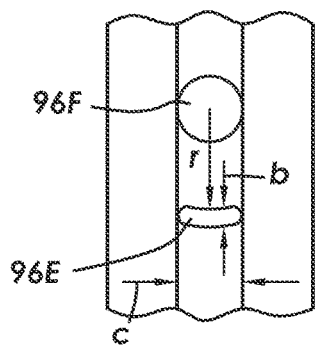
FIG. 9C is a side elevational view of one embodiment of the geometry for the pins of FIGS. 9A and 9B.

The embodiments of FIGS. 9A-9D also address alternate constrained lift design in close up illustrations of engagements of pins within rotating lugs. In many of the illustrative examples the multi-position clamp is secured on top of a horizontal substrate and the lift is than vertically away from the substrate and the clamp base attached thereto. However, it should be understood that the substrate, and thereby the clamp base, can be in any orientation and the "lift" is away from the clamp base and not necessarily vertically and directed against gravity. In the embodiments of FIGS. 9A-9D, the movement is very clearly a two-step operation rather than one fluid movement. It is lift away from the clamp base (not shown) and then pivot plate 78 (not shown) driven by a camming action of pin 96E traveling in secondary track 122 while fixedly secured to pivot plate 78. Compare FIG. 8A. In the illustrated embodiments of this FIG. 9 series, pins 96E and 96F are not symmetrical. See FIG. 9B illustrating a combined pin embodiment 96C. Returning to FIG. 9A, pin 96E has the width "c" to track with pin 96F through a primary track 120 as if was twin pins, but at the end of the vertical rise, pin 96F becomes the pivot point and pin 96E rotates into a secondary track 122 which, at thickness "b", is too narrow for pin 96F to have entered. See FIG. 9C. It may be desirable to provide a tight radius "r" like FIG. 8B such that pivot pin 96F comes to a stable landing position 96J at the end of primary track 120 before rotation (see arrow 104) of pin 96E which is then in position 96G and ready for rotation into secondary tracks 122 as illustrate with position 96H advancing toward position 96I.

Figure 9D:
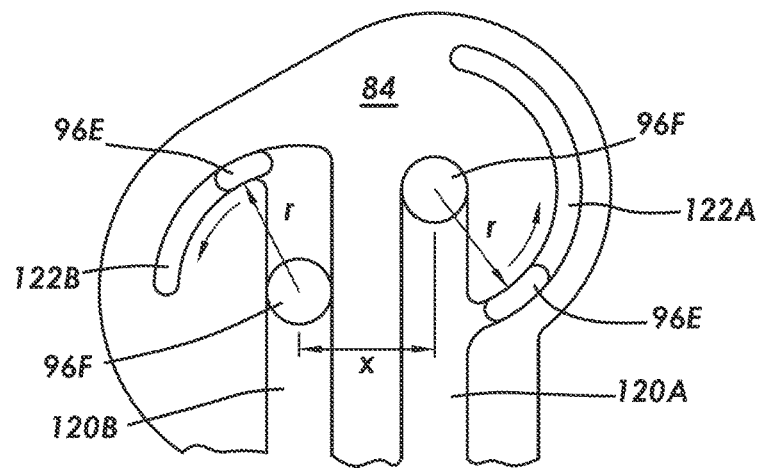
FIG. 9D is a side elevational view in close up of the rotating tracks of a two radius, two track system.

FIG. 9D is an adaptation of the embodiment of FIG. 9A with side tracks 122A and 122B off of tracks 120A and 120B, respectively, providing a choice of two different patterns for installing fixtures. Spacing "x" that accommodates a desired change in radius for an alternative pattern, may prove insufficient to accommodate similarly oriented side tracks. In this case it may be desirable to change the orientation of side tracks 122A and 122B, as illustrated here. It should be appreciated that although pins are shown in both of the alternate track sets, one can be used at a time, mounting through the pivot plate (not shown). Moving from one track to the other then can involve flipping the dual pin system by turning handle 96C 180 degrees. Refer also to FIG. 9B.

Figure 10A:
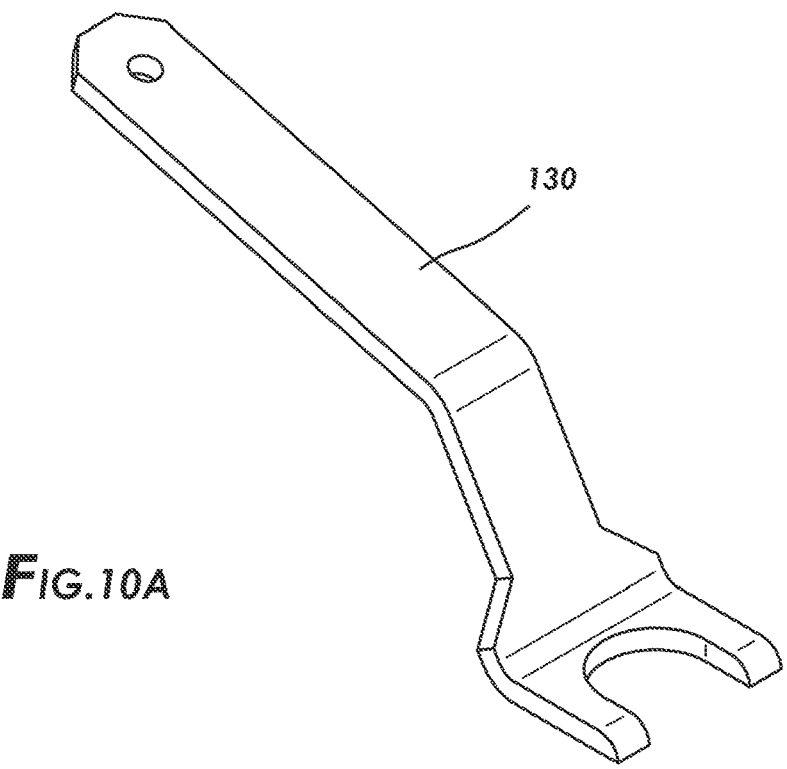
FIG. 10A is a perspective views of a pry bar for assisting vertical lift in the practice of some embodiments of the present invention.
Figure 10B:
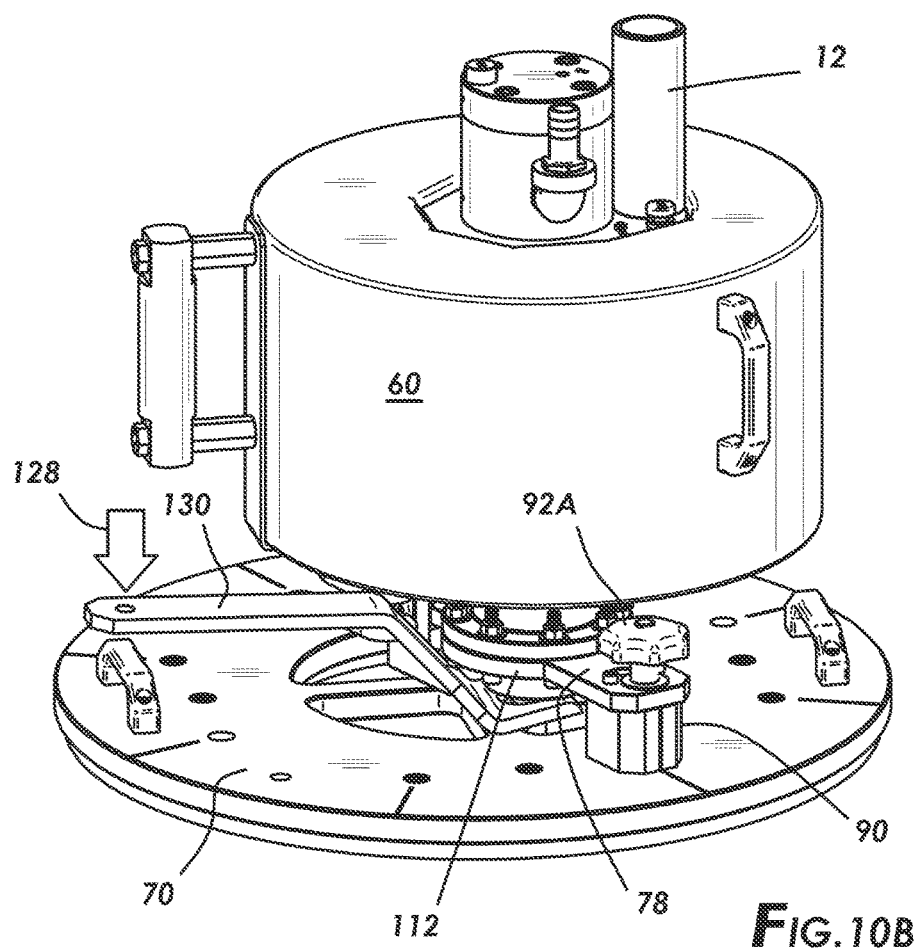
FIG. 10B is a perspective view of the pry bar of FIG. 10A deployed in a portable friction welding system in accordance with one embodiment of the present invention.

FIGS. 10A and 10B illustrate the use of a pry bar 130 configuration to facilitate the vertical lift with FIG. 10B illustrating the application of the pry bar with the embodiment of FIGS. 7A-7D, applying force "f" (see arrow 128) to lift pivot plate 78 after retaining pin 116 (not shown) has been withdrawn and hold down captivated bolt 92A has been released. Recall FIG. 6C. Alternatively, it should be appreciated that pry bar 130 may be incorporated into pivot and rotation hardware assembly 112 to facilitate a leveraged lift opportunity.

Figure 11:
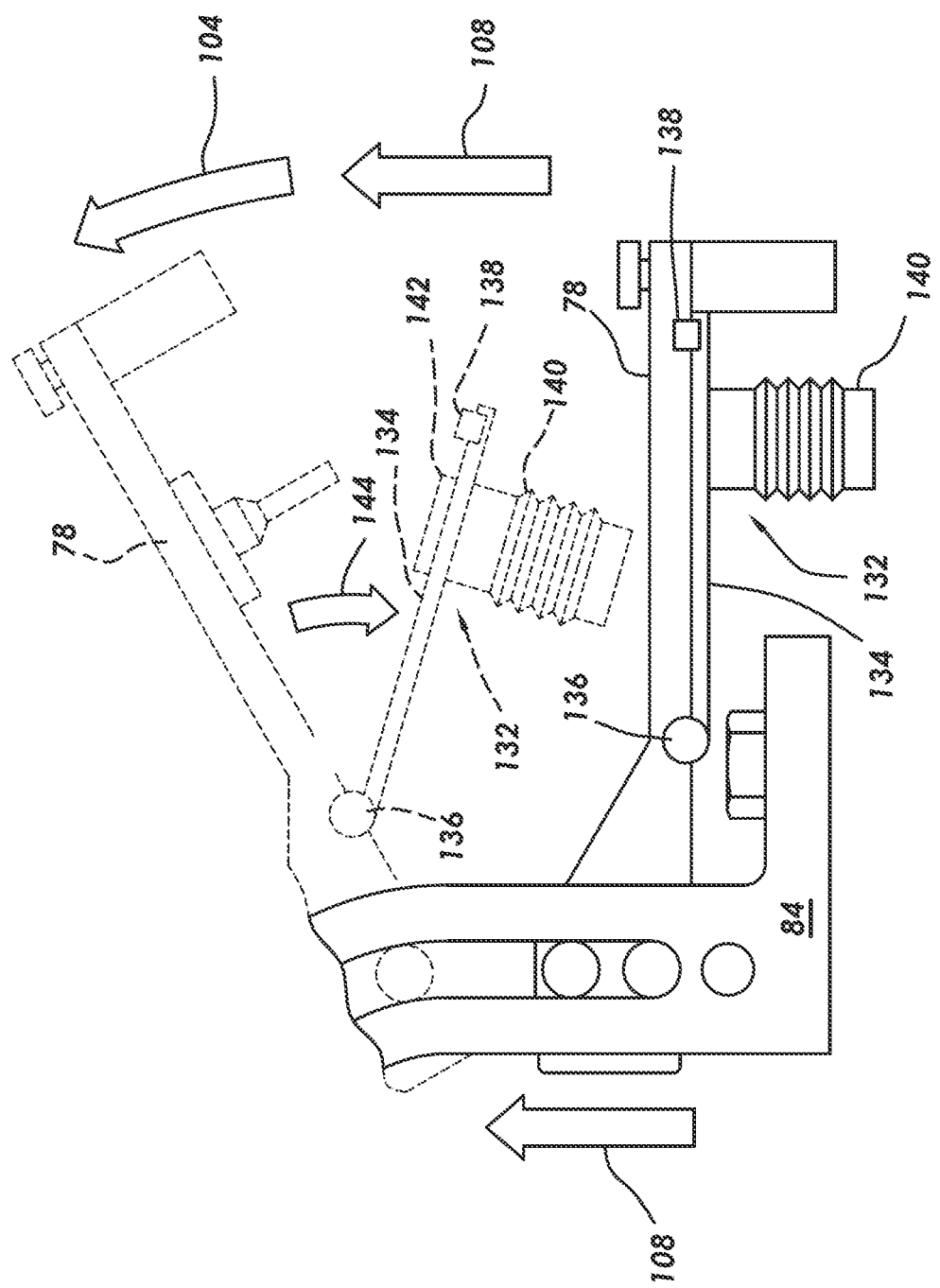
FIG. 11 is a side elevational view of an alternate embodiment of a rotating lug and pivot plate assembly accommodating a drop-down shroud.

The rotation hardware assembly of FIG. 11 introduces the added feature of a drop down shroud system 132. Shrouds 140 are used to extend portable friction welding into hazardous environments and more generally, shrouds are well known for bathing welding operations in inert gas such argon to purge explosive mixtures from the immediate location and to hold both fuel and oxygen away. And in underwater applications, shrouds can be mitigate concerns of an excessive quench rate of friction welding in contact with water. However, the shroud dimensions best usable through windows 88 in clamp base 70 make it difficult to manage loading fixtures. Shroud system 132 includes a yoke 134 hingedly connected beneath pivot plate 78 through hinges 136 and can be secured by a latch 138. Further, a shroud engagement seat 142 presented through yoke 134 engages shroud 140 in sealing communication with the base of portable friction welding tool 12 (not shown). Engagement seat 142 may be as simple as a press fit engagement, or may be more involved, e.g. a quarter turn engagement accessible from below the yoke. Even though friction welding is known for its very tightly localized and quickly dissipating heating effect, shroud materials should be selected for adequate heat resistance (especially for tight fitting shrouds.) One readily available option may be metal bellows designed for high heat applications.

After pivot arm 78 is lifted (see arrow 108) and pivoted (see arrow 104) about its connection to rotating lug 84, shroud drop down system 132 is used. Shroud system 132 allows efficient use of a shroud, in tight quarters, easily bringing the shroud out of the way for loading fixtures (see arrow 144) and easily returning it to position once the fixture is loaded. That the system is never separated from the portable friction welding system during operation facilitates rapid, sure placement and prevents to loss of components.

Figure 12A:
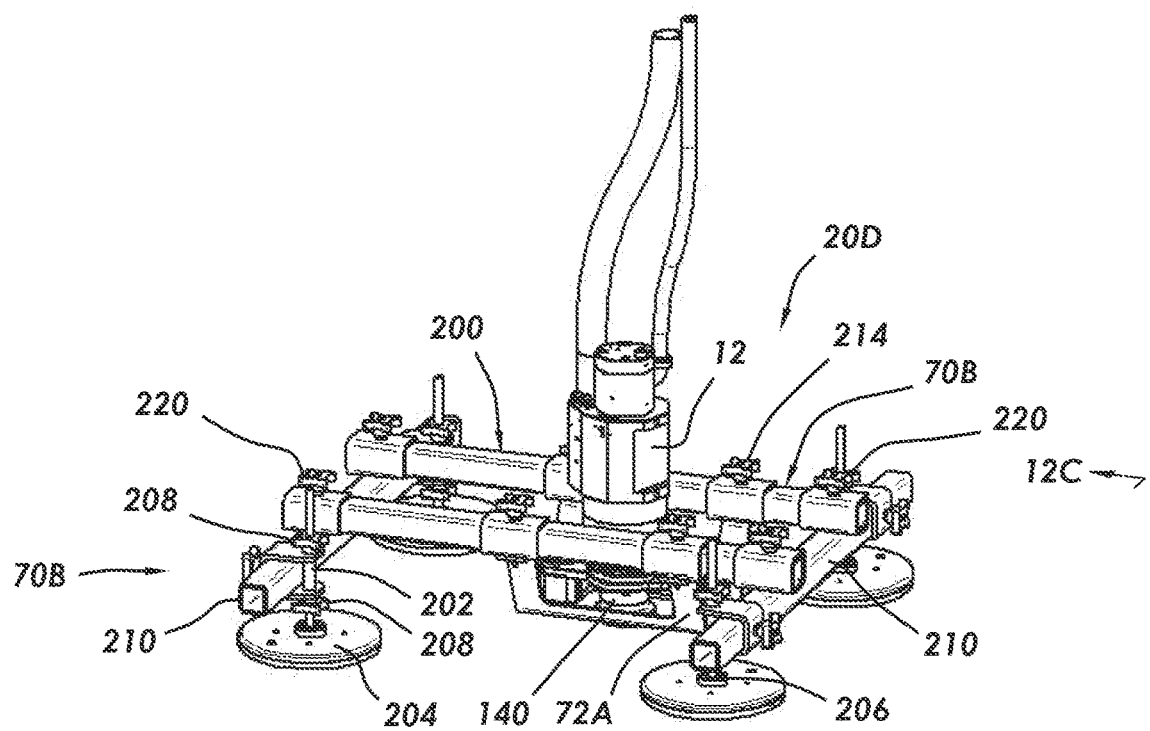
FIG. 12A is a perspective view from the top of a portable friction welding system in accordance with an alternate embodiment of the present invention with an alternate clamp base and indexing as a function of X-Y location.
Figure 12B:
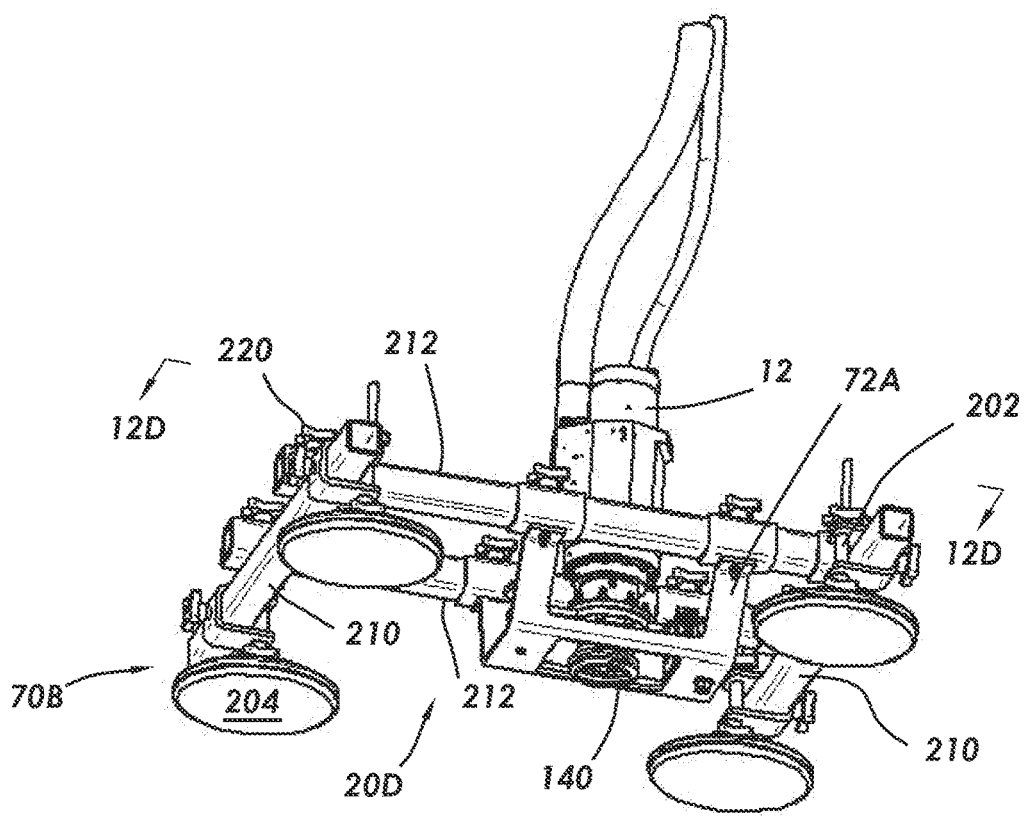
FIG. 12B is a perspective view from the bottom of the portable friction welding system of FIG. 12A.
Figure 12E:
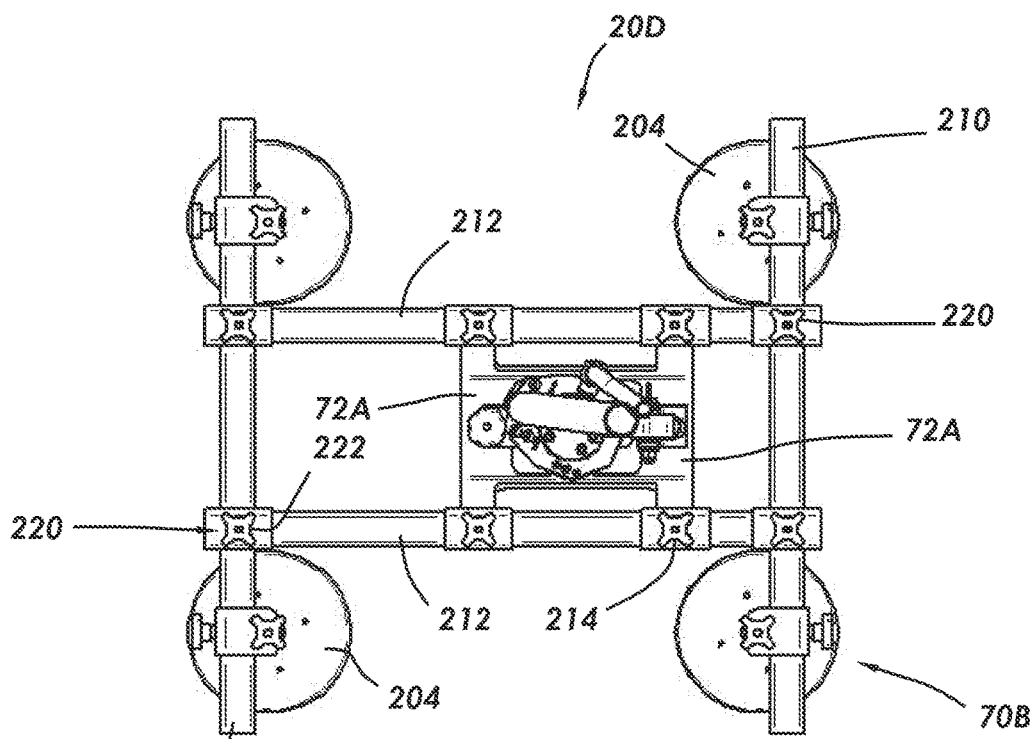
FIG. 12E is a top elevational view of the portable friction welding system of FIG. 12A taken at line 12E-12E in FIG. 12D.

FIGS. 12A-12F illustrate another multi-position clamp system 20D for use with portable friction welding tool 12 as an alternate embodiment of the present invention. FIGS. 12A and 12B are perspective views of clamp system 20D from above and below, respectively, and FIGS. 12C, 12D and 12E are elevational views of the end, front and top of the clamp system, respectively.

Here clamp base 70B is provided with an indexable framework 200 connected with legs 202 to a plurality of feet 204. These feet may be part of any number of hold down systems, including, but not limited to, individual vacuum pads cooperating through a common vacuum line; individual magnets; or high-friction pads in combination with chain or strap clamps, c-clamp fasteners or other mechanical constraints. Connecting legs 202 to feet 204 through an articulated joint 206 and affording an adjustment system 208, e.g., hand tightened knobs engaging threads on the exterior of legs 202, afford versatility for engaging an uneven or even non-planar substrate.

In this illustrative embodiment, framework 200 comprises a pair of beams 210, each connected to a pair of legs 202, and a pair of rails 212, each attached at its ends to one of beams 210. Traveling mount 72A receives portable friction welding tool 12 through an articulated fixture loading system 76A and is disposed to slide on rails 212 between indexed positions for shooting a precise pattern of fixtures, e.g., guided by markings or detents along one of rails 212. Once in position, hand tightened knobs 214 are tightened to secure that indexed position with the rail. See particularly FIGS. 12E and 12F.

Figure 12F:
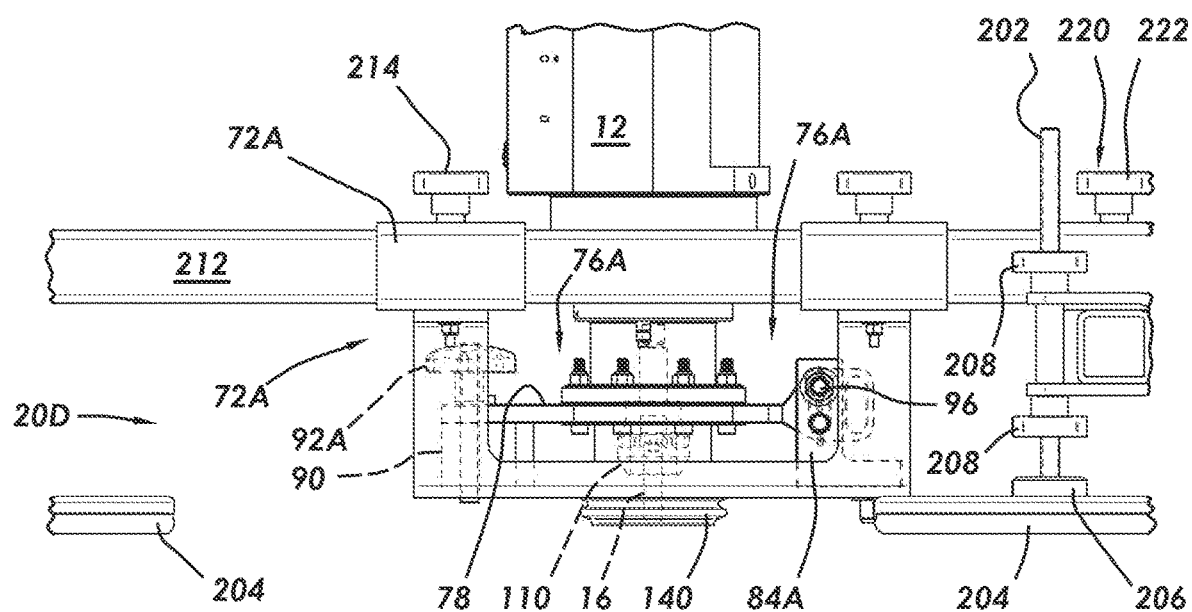
FIG. 12F is a front elevational close-up of a traveling mount in the portable friction welding system of FIG. 12A.

FIG. 12F illustrates articulated fixture loading system 76A comprising a lug 84A fixedly secured to travelling mount 72A and pivotally engaging one end of pivot plate 78 through a pivot bolt 96. The other end of the pivot plate receives a bearing block 90 and a hand tightenable captivated bolt 92A which is releasably securable to traveling mount 72A. The discussion of earlier embodiments may be generally referenced for working the mechanism of this embodiment to facilitate loading successive fixtures without disconnecting portable friction welding tool 12 from clamp base 20D. However, as the movement of traveling mount 72A in the sliding engagement with rails 212 serves to move from one indexed position to another, the rotation illustrated, e.g., in FIG. 4C by arrow 102 for angular displacement or ability to shift the radius as indicated by arrow 106 in that figure are not necessary for this embodiment.

The forgoing components and configuration can efficiently provide a precise straight-line or x-axis pattern. However, the ability to reposition rails 212 between indexed positions along beams 210, e.g., with slides 220 releasably securable with hand tightening knobs 222 can add greater versatility by enabling indexed location on both a transverse and longitudinal adjustment, i.e., an indexable x-y pattern from a single clamp base position.

The framework of this embodiment is afforded multiple adjustment features to accommodate a wide variety of conditions and the square frame components allow interchangeability to easily construct a suitably sized frame to accommodate a wide range of patterns.

Another feature of framework 200 is that it defines a plane and fixtures within the pattern will be orthogonal to this plane and parallel to each other, even if the substrate is irregular or curved. This avoids splayed fixture installation and the attendant challenges to install equipment thereon. If substrate irregularities and curvature are sufficient, provisions may be made in the tool/traveling mount interface or in the connection of the traveling mount to the rails 212 to provide adjustment orthogonal to the x-y plane, i.e., in the z-axis.

Yet another aspect of this alternate embodiment is the inclusion of a shroud 140 in a sealing relationship with the front of portable friction welding tool 12 and extending through base clamp 20D toward the substrate while isolating the collet and fixture. Use in hazardous environments with a potential presence of explosive gases may be facilitated by providing a source of inert gas to purge the immediate, isolated fixture installation site of both explosive gas and oxygen. While this may be an application of the embodiment of FIG. 11, the shroud deployed in this clamp base is not constrained to fit in windows 88 as in various other illustrative embodiments in this application for a clamp base. This affords an opportunity to enlarge the diameter of the shroud and may afford access for installing fixtures with shroud 140 mounted directly to the front of portable friction welding tool 12. Or another alternative would be mounting the shroud to depend from traveling mount 72A while providing a sufficient seal from tool 12 to shroud 140.

It is to be understood that the apparatus and methods described herein may be implemented in various forms and those skilled at the art should appreciate that they can readily use the disclosed conception and specific embodiments as a basis for designing or modifying other structures for carrying out the same purposes of the present invention as defined by the patent claims. The detailed description describes several distinct embodiments and it will be understood that not all of that detail, while exemplary, is essential to the claimed invention. Thus, other modifications, changes and substitutions are intended to the foregoing disclosure and in some instances some features of the invention will be employed without a corresponding use of other features. Accordingly, it is appropriate for the patent claims be construed broadly and in a manner consistent with the spirit and scope of the invention herein.

Further, those skilled in the art, given the benefit of this disclosure, may adapt portable friction welding precise patterns to systems with other pneumatic, hydraulic and electrical drives without departing from the scope of this aspect of the present invention and may apply the present invention to all manners of clamp base attachment systems where a precise pattern of fixtures is required—whether vacuum, magnetic, chain, strap, multiple foot, c-clamps, other or combination.

What is claimed is:

1. An indexable, multi-position clamp for positioning and holding a portable friction welding tool adjacent a substrate for friction welding a plurality of fixtures in a pattern referenceable from a fixed position on a substrate, said clamp comprising:
    a clamp base securable at the fixed position on the substrate;
    a traveling mount comprising:
        a tool mount for receiving said portable friction welding tool;
        a connection to the clamp base allowing relative movement of the tool mount over the substrate; and
        index stops accessible with the relative movement of the tool mount over the substrate whereby the pattern for the plurality of fixtures is referenceable from the fixed position of the clamp base on the substrate;
        an articulated fixture loading system engaging the tool mount in a manner so as to allow reorientation of said mounted portable friction welding tool, when mounted in said tool mount, to a position allowing access for loading the fixture without disengaging and removing said portable friction welding tool from connection with the clamp base.

2. An indexable, multi-position clamp in accordance with claim 1 wherein the clamp base further comprises an adjustment system to facilitate securing the clamp base on the substrate where the substrate presents other than an even, planar surface, whereby a plane parallel to the clamp base and through which the traveling mount moves is positionable over the substrate for installing the pattern for the plurality of fixtures, each said fixture in the pattern being parallel and orthogonal to the plane.

3. An indexable, multi-position clamp in accordance with claim 1 wherein the travelling mount further comprises:
   a pivot plate presenting the tool mount between a pivot end and a bearing block presented on the pivot plate; and
   a rotating lug rotatably connecting the pivot plate to the clamp base;
   whereby the connection to the clamp base allowing relative movement of the tool mount over the substrate is provided by the rotating lug and the relative movement is circular and whereby the index stops are selectable engagement point between the bearing block and the clamp base.

4. An indexable, multi-position clamp in accordance with claim 3 wherein the articulated fixture loading system comprises a pivoting connection between the rotating lug and the pivot plate, said pivoting connection allowing the pivot plate to tilt away from the base clamp to allow access for loading a fixture.

5. An indexable, multi-position clamp in accordance with claim 4 wherein the pivot plate further comprises:
   a plurality of possible connections between the pivot plate and the rotating lug presenting a choice of diameters for the circular movement between the tool mount on the pivot plate and the substrate whereby the clamp provides a choice of the patterns.

6. An indexable, multi-position clamp in accordance with claim 1 wherein the articulated fixture loading system further comprises:
   a pivot plate presenting the tool mount between a pivot end and a bearing block presented on the pivot plate; and
   a lug pivotally connecting the pivot plate to the clamp base wherein the connection between the pivot plate and the lug is configured to allow the pivot plate to first withdraw orthogonally away from the clamp base before tilting;
   whereby the articulated fixture loading system in configured such that a portable friction welding tool connected to the pivot plate at the tool mount can be pulled straight away from the substrate so as to allow the portable friction welding tool to clear the fixture before tilting to provide access for subsequent fixture installation.

7. An indexable, multi-position clamp in accordance with claim 6, further comprising:
   a lowermost position passage through the lug and the pivot plate; and
   a retaining pin releasably engageable within the lowermost position passage to secure a retaining connection of the pivot plate to the lug with the tool mount in position for fixture installation.

8. An indexable, multi-position clamp in accordance with claim 7 wherein the pivoting connection between the pivot plate and the lug further comprises:
   a pivot pin;
   an elongated reception slot presented on the pivot plate orthogonal to the tool mount for slidably receiving the pivot pin; and
   a first and a second ear extending from the lug and disposed to receive the pivot plate therebetween and defining a first pair of aligned holes for a pivoting connection and a second a pair of aligned holes in the lowermost position passage for a retaining connection; and
   a retaining pin;
   whereby the pivot pin can be extended through the first pair of aligned holes and captured in the elongated reception slot on the pivot plate in a configuration such that the portable friction welding tool connected to the pivot plate at the tool mount can be pulled straight away from the substrate so as to allow the portable friction welding tool to clear the fixture before tilting to provide access for subsequent fixture installation and the retaining pin is releasably engageable within the lowermost position passage of the second pair of aligned holes and engagement with the pivot plate so as to secure a retaining connection of the pivot plate to the lug with the tool mount in position to present the portable friction welding tool for insertion of the subsequent fixture in preparation for fixture installation.

9. An indexable, multi-position clamp in accordance with claim 6 wherein the articulated fixture loading system further comprises:
   a first and a second ear extending from the rotating lug and disposed to receive a pivot end of the pivot plate therebetween and each ear defining a set of tracks having a straight section disposed orthogonally to the clamp base and a curved section dropping away from a distal end of the pivot plate;
   a pair of pins engagable within the set of tracks; and
   a pair of holes through the pivot end of the pivot plate disposed to be received between the first and second ears and engagable with the pair of pins engaged within the set of tracks;
   whereby the pins are adapted to connect the pivot plate to the rotating lug in a constrained relationship such that the tool mount can be initially pulled straight away from the substrate thereby clearing the fixture and then pivots in rotation to tilt the pivot plate through a camming action between the pins and the set of tracks to allow access for loading the subsequent fixture.

10. An indexable, multi-position clamp in accordance with claim 6 further comprising:
    a first and a second ear extending from the rotating lug and disposed to receive the pivot plate therebetween and each defining a first set of elongated tracks having a straight section disposed orthogonally to the clamp base and a curved section;
    a pair of pins engagable within the first set of elongated tracks; and
    a pair of holes through the pivot plate disposed to be received between the first and second ears and engagable with the pair of pins engaged within the first set of elongated tracks;
    whereby the pins are adapted to connect the pivot plate to the rotating lug in a constrained relationship such that the tool mount can be initially pulled straight away from the substrate thereby clearing the fixture and then rotated to tilt the pivot plate through a camming action between the pins and the first set of elongated tracks to allow access for loading the subsequent fixture.

11. An indexable, multi-position clamp in accordance with claim 10 wherein the first and second ears each define a second set of elongated tracks having a straight section disposed orthogonally to the clamp base and a curved section, said second set of elongated tracks being offset from the first set of elongated tracks whereby the first and second sets of elongated tracks afford a plurality of possible rotating connections between the pivot plate and the lug presenting a choice of diameters for the circular movement between the tool mount on the pivot plate and the substrate whereby the clamp provides a choice of patterns.

12. An indexable, multi-position clamp in accordance with claim 6 further comprising:
   a first and a second ear extending from the rotating lug and disposed to receive the pivot plate therebetween;
   a set of corresponding primary tracks defined in the first and second ears, the primary tracks presenting a straight section disposed orthogonally to a plane defined by the relative movement of the tool mount over the substrate in forming the pattern of fixtures; a set of corresponding secondary tracks defined in the first and second ears, the secondary tracks presenting a curved section;
   a pivot pin engagable in the primary tracks within the rotating lugs and capturing the pivot plate in a pivotable engagement; and
   a rotation pin engagable in the secondary tracks within the rotating lugs and capturing the pivot plate between the secondary tracks;
   whereby the rotation pin and the pivot pin are adapted to connect the pivot plate to the rotating lug in a constrained relationship traveling through the primary tracks such that the tool mount is initially pulled straight away from the substrate thereby clearing the fixture and then the rotation pin engages the secondary track and camming action rotating about the pivot pin to tilt the pivot plate and tool mount to a position allowing access for loading a subsequent fixture.

13. An indexable, multi-position clamp in accordance with claim 12 further comprising:
   a single handle projecting both the pivot pin and the rotation pin; wherein the rotation pin has a thickness "b" which is less than a diameter "c" of the pivot pin; and
   wherein the set of secondary tracks branch off of the set of primary tracks and present a thickness that accepts passage of the rotation pin are adapted to, but does not allow the pivot pin to enter;
   whereby the pivot pin and the rotation pin are engagable in a configuration adapted to travel through the primary tracts together, the pivot pin stopping travel through the set of primary tracks and the rotation pin turning out of the primary tracks to pivot about the pivot pin and rotate into the secondary tracks causing the pivot plate to engage both the pivot pin and the rotation pin to rotate, tilting after first moving together through the set of primary tracks.

14. An indexable, multi-position clamp in accordance with claim 1 wherein the traveling mount further comprises:
   a pivot plate presenting the tool mount between a pivot end and a distal end;
   a bearing block presented on the distal end of the pivot plate; and
   wherein the lug rotatably connects the pivot plate to the clamp base in any of a choice of a plurality of possible connections;
   whereby the connection of the pivot plate to the clamp base is configured to allow relative movement of the tool mount over the substrate is provided by the rotation about the lug and the relative movement is circular, whereby the index stops are selectable engagement point between the bearing block and the clamp base and whereby the choice of a plurality of possible connections between the pivot plate and the rotating lug presents a choice of diameters for the pattern of fixtures, organizing the pattern in a polar coordinate system.

15. An indexable, multi-position clamp in accordance with claim 1 wherein the clamp base further comprises:
   a plurality of parallel rails;
   legs attached to the rails;
   feet attached to the legs and securable to the substrate; and
   a plurality of beams slidably attached to the rails;
   wherein the traveling mount slidably connects to the beams, whereby manipulation of the traveling mount along the beams and the beams along the rails affords an x-y indexing system for positioning the tool mount.

16. An indexable, multi-position clamp in accordance with claim 15 comprising:
   an adjustment system connected to the legs; and
   a plurality of articulated joints connecting the feet to the legs;
   whereby the clamp base is securable on the substrate presenting other than an even, planar surface at an optimized orientation for installing the pattern for the plurality of fixtures, each said fixture in the pattern being parallel.

17. An indexable, multi-position clamp in accordance with claim 15 wherein the articulated fixture loading system further comprises:
   a pivot plate; and
   a pivoting connection between the lug and the pivot plate, said pivoting connection allowing the pivot plate to tilt away from the base clamp to allow access for loading a fixture.

18. An indexable, multi-position clamp for positioning and holding a portable friction welding tool adjacent a substrate for friction welding a plurality of fixtures to the substrate in a pattern, said clamp comprising:
   a clamp base having a central hub and a plurality of windows providing access through the clamp base to the substrate, the clamp base being securable to the substrate for the installation of the plurality of fixtures through the windows; and
   a pivot and rotation hardware assembly connectable to the base clamp, comprising:
      a rotating lug;
      a connection rotatively securing the rotating lug to the clamp base at the hub;
      an elongated pivot plate having a proximal end and a distal end and pivotally connected at its proximal end to the rotating lug;
      a tool mount;
      an engagement system for receiving said portable friction welding tool in an attachment to the pivot plate at the tool mount;
      a positioning system for releasably securing the distal end of the pivot plate to the clamp base at a desired selection among the index points provided on the clamp base, the positioning system comprising:
         a plurality of tapped holes in the clamp base serving as index points;
         a bearing block assembly connected to the distal end of the pivot plate;
         a hold down bolt extending through the pivot plate and the bearing block assembly and engagable with a desired selection within the plurality of tapped holes;
         whereby the pivot plate can be rotated about the rotating lug in a plane parallel to the clamp base to bring the portable friction welding tool to the desired selection of index point in a circular movement and lock down to shoot a first installation of a fixture within the pattern of fixtures indexed in relation to the position of the base clamp to the substrate and whereby the pivot plate can be pivoted between a plurality of shots to raise and tilt the portable friction welding tool to provide access to load the fixtures without disconnecting the clamp base from the substrate or the portable friction welding tool from the clamp base.

19. An indexable, multi-position clamp in accordance with claim 18 wherein the pivot plate further comprises:
   a plurality of possible pivoting connections between the pivot plate and the rotating lug presenting a choice of diameters for the circular movement between the tool mount on the pivot plate and the substrate whereby the clamp provides a choice of the patterns.

20. An indexable, multi-position clamp in accordance with claim 18 wherein the pivotal connection between the pivot plate and the rotating lug is configured to allow the pivot plate to first withdraw orthogonally away from the clamp base before tilting;
   whereby the tool mount can be pulled straight away from the substrate so as to allow the portable friction welding tool to clear the first fixture before tilting to provide access for fixture loading for subsequent fixture installation.

21. An indexable, multi-position clamp in accordance with claim 19, further comprising:
   a lowermost position passage through the rotating lug and the pivot plate; and
   a retaining pin releasably engageable within the lowermost position passage to secure a retaining connection of the pivot plate to the lug with the tool mount in position for fixture installation.

22. An indexable, multi-position clamp in accordance with claim 20 further comprising:
   a pivot pin;
   an elongated reception slot presented on the pivot plate orthogonal to the clamp base for slidably receiving the pivot pin; and
   a first and a second ear extending from the lug and disposed to receive the pivot plate therebetween and defining a first pair of aligned holes for a pivoting connection and a second a pair of aligned holes in the lowermost position passage for a retaining connection; and
   a retaining pin;
   whereby the pivot pin can be extended through the first pair of aligned holes and capturing the pivot plat through the elongated reception slot in a configuration such that the portable friction welding tool connected to the pivot plate at the tool mount can be pulled straight away from the substrate so as to allow the portable friction welding tool to clear the fixture before tilting to provide access for subsequent fixture installation and the retaining pin is releasably engageable within the lowermost position passage of the second pair of aligned holes and engagement with the pivot plate so as to secure a retaining connection of the pivot plate to the rotating lug with the tool mount in position to present the portable friction welding tool for insertion of the subsequent fixture in preparation for fixture installation.

23. An indexable, multi-position clamp in accordance with claim 20 further comprising:
   a first and a second ear extending from the rotating lug and disposed to receive a pivot end of the pivot plate therebetween and each ear defining a set of tracks having a straight section disposed orthogonally to the clamp base and a curved section dropping away from a distal end of the pivot plate;
   a pair of pins engagable within the set of tracks; and
   a pair of holes through the pivot end of the pivot plate disposed to be received between the first and second ears and engagable with the pair of pins engaged within the set of tracks;
   whereby the pins are adapted to connect the pivot plate to the rotating lug in a constrained relationship such that the tool mount can be initially pulled straight away from the substrate thereby clearing the fixture and then pivots in rotation to tilt the pivot plate through a camming action between the pins and the set of tracks to allow access for loading the subsequent fixture.

24. An indexable, multi-position clamp in accordance with claim 20 further comprising:
   a first and a second ear extending from the rotating lug and disposed to receive a pivot end of the pivot plate therebetween:
      each ear defining a first set of tracks having a straight section disposed orthogonally to the clamp base and a curved section dropping away from a distal end of the pivot plate a second set of elongated tracks having a straight section disposed orthogonally to the clamp base and a curved section;
      each ear further defining a second set of elongated tracks being offset from the first set of elongated tracks whereby the first and second sets of elongated tracks afford a plurality of possible rotating connections between the pivot plate and the lug and thereby presenting a choice of diameters for the circular movement between the tool mount on the pivot plate and the substrate whereby the clamp provides a choice of patterns.

25. An indexable, multi-position clamp in accordance with claim 20 further comprising:
   a first and a second ear extending from the rotating lug and disposed to receive the pivot plate therebetween;
   a set of corresponding primary tracks defined in the first and second ears, the primary tracks presenting a straight section disposed orthogonally to a plane defined by the relative movement of the tool mount over the substrate in forming the pattern of fixtures;
   a set of corresponding secondary tracks defined in the first and second ears, the secondary tracks presenting a curved section;
   a pivot pin engagable in the primary tracks within the rotating lugs and capturing the pivot plate in a pivotable engagement; and
   a rotation pin engagable in the secondary tracks within the rotating lugs and capturing the pivot plate between the secondary tracks;
   whereby the rotation pin and the pivot pin are adapted to connect the pivot plate to the rotating lug in a constrained relationship traveling through the primary tracks such that the tool mount is initially pulled straight away from the substrate thereby clearing the fixture and then the rotation pin engages the secondary track and camming action rotates about the pivot pin to tilt the pivot plate and tool mount to a position allowing access for loading a subsequent fixture.

26. An indexable, multi-position clamp in accordance with claim 25 further comprising:
- a single handle projecting both the pivot pin and the rotation pin; wherein the rotation pin has a thickness "b" which is less than a diameter "c" of the pivot pin; and
- wherein the set of secondary tracks branch off of the set of primary tracks and present a thickness that accepts passage of the rotation pin are adapted to, but does not allow the pivot pin to enter;
- whereby the pivot pin and the rotation pin are engagable in a configuration adapted to travel through the primary tracts together, the pivot pin stopping travel through the set of primary tracks and the rotation pin turning out of the primary tracks to pivot about the pivot pin and rotate into the secondary tracks causing the pivot plate engaged to both the pivot pin and the rotation pin to rotate, tilting after first moving together through the set of primary tracks.

27. An indexable, multi-position clamp in accordance with claim 18 further comprising:
- a yoke pivotally attached to the underside of the pivot plate through a hinge on the proximal end of the pivot plate;
- a shroud connected to and depending from the yoke, the shroud being disposed to surround the fixture during installation;
- an engagement seat presented on an end of the shroud facing the portable friction welding tool; and
- a latch selectively securing the yoke to move with the pivot plate;
- whereby the shroud can swing out of the way for installing the fixture into the portable friction welding tool and swing with the pivot plate to surround the fixture.

28. A method for friction welding a plurality of fixtures to a substrate in a pattern referenced from a selected fixed position on the substrate, said method comprising:
- temporarily securing a clamp base at the selected fixed position on the substrate for the pattern of the fixtures;
- attaching said portable friction welding tool to a traveling mount providing a fixture loading system;
- attaching the traveling mount to the clamp base through a connection allowing relative movement of the portable friction welding tool over a plurality of indexed positions relative to the substrate;
- moving the portable friction welding tool to a first selection from among the indexed positions relative to the substrate and locking the travelling mount in position;
- installing one of the fixtures at a first indexed position within the pattern;
- articulating the portable friction welding tool using the fixture loading system to reorient the position of the portable friction welding tool allowing access for loading a next of the fixtures into a collet without disengaging and removing said portable friction welding tool from connection with the clamp base;
- installing the next fixture in the collet;
- moving the portable friction welding tool to a next selection from among the indexed positions relative to the substrate and locking the travelling mount in position;
- installing the next fixture to the substrate; and
- repeating steps to install subsequent fixtures at subsequent indexed positions until the precise pattern has been completed.

29. A method for friction welding a plurality of fixtures to a substrate in a pattern in accordance with claim 28 wherein articulating the portable friction welding tool further comprises withdrawing the pivot plate and portable friction welder installed thereon orthogonally away from the clamp base before tilting the pivot plate, whereby the portable friction welding tool can be pulled straight away from the substrate so as to allow the portable friction welding tool to clear the first fixture before tilting to provide access for loading the next fixture into the portable friction welding tool.

30. A method for friction welding a plurality of fixtures to a substrate in a pattern in accordance with claim 28 further comprising providing a choice of a plurality of possible connections between the rotatable lug and the pivot plate;
- whereby the connections of the pivot plate to the rotatable lug to the clamp base are configured to allow relative movement of the portable friction welding tool over the substrate in a circular motion, the index stops define the angular position and the choice of a plurality of possible connections between the pivot plate and the rotating lug presents a choice of diameters for the circular motion defining the pattern of fixtures in a polar coordinate system.

31. A method for friction welding a plurality of fixtures to a substrate in a pattern in accordance with claim 28 further comprising:
- providing the clamp base with a plurality of legs attaching a plurality of feet to the clamp base and providing an adjustment system connected to the legs; and
- adjusting the legs to present the pivot plate in an optimal orientation;
- whereby the clamp base is securable on the substrate even in the presence of a nonplanar surface and installing the pattern for the plurality of fixtures in parallel alignment.

\* \* \* \* \*